United States Patent [19]

Fletcher et al.

[11] 3,783,250

[45] Jan. 1, 1974

[54] ADAPTIVE VOTING COMPUTER SYSTEM

[76] Inventors: James C. Fletcher, Administrator of the National Aeronautics and Space Administration with respect to an invention of; Louis J. Koczela, 2900 Maple Tree Dr., Orange, Calif. 92667; Donald S. Wilgus, 24481 Castello Cir., Mission Viejo, Calif. 92675

[22] Filed: Feb. 25, 1972

[21] Appl. No.: 229,354

[52] U.S. Cl. .......... 235/153 AK

[51] Int. Cl. .......... G06f 15/16

[58] Field of Search .......... 235/153 AE, 153 AK; 340/172.5

[56] References Cited

UNITED STATES PATENTS

| | | | |
|---|---|---|---|
| 3,312,954 | 4/1967 | Bible et al. | 235/153 AE |
| 3,348,197 | 10/1967 | Akers, Jr. et al. | 235/153 AE |
| 3,593,307 | 7/1971 | Gouge, Jr. et al. | 235/153 AE |
| 3,614,401 | 10/1971 | Lode | 235/153 AE |
| 3,624,372 | 11/1971 | Philip | 235/153 AE |
| 3,654,603 | 4/1972 | Gunning et al. | 235/153 AE |
| 3,665,173 | 5/1972 | Bouricius et al. | 235/153 AE |
| 3,681,578 | 8/1972 | Stevens | 235/153 AE |

*Primary Examiner*—Charles E. Atkinson
*Attorney*—Marvin J. Marnock et al.

[57] ABSTRACT

A computer system using adaptive voting to tolerate failures and operate in a fail-operational, fail safe manner. Each of four computers is individually connected to one of four external input/output (I/O) busses which interface with external subsystems. Each computer is connected to receive input data and commands from the other three computers and to furnish output data and commands to the other three computers.

An adaptive control apparatus including a voter-comparator-switch (VCS) is provided for each computer to receive signals from each of the computers and permits adaptive voting among the computers to permit the fail-operational, fail-safe operation.

7 Claims, 18 Drawing Figures

ADAPTIVE VOTING COMPUTER SYSTEM

ORIGIN OF THE INVENTION

The invention described herein was made in the performance of work under a NASA contract and is subject to the provisions of Section 305 of the National Aeronautics and Space Act of 1958. Public Law 85-568 (72 Stat. 435; 45 U.S.C. 2457).

BACKGROUND OF THE INVENTION

Field of Invention

The present invention relates to digital computer systems.

Description of the Prior Art

In the prior art, such as U.S. Pat. Nos. 3,536,259; 3,348,197; and 3,517,171, certain approaches towards error-detection and fail-safe operation in individual digital computers were attempted.

One approach used special error detecting codes to determine if a subsystem or unit in the computer had failed. Upon detection of a failure, the failed subsystem was either replaced by self-repairing circuitry in the computer, or the computer forced to "fail-safe" and adapt an operating status causing the equipment controlled to remain in a safe condition.

A second approach was to use voting or comparison between redundant subsystems, with a majority of the voting subsystems determining the proper operating condition and indicating failure of subsystems which were not in such condition.

While the prior art was useful for individual computers, the prior art approaches were undesirable for use with long duration, high reliability computer requirements, such as guidance and control for extended space flight missions.

SUMMARY OF INVENTION

Briefly, the present invention provides an adaptive control apparatus for interconnecting operational units of a plurality of self-testing computer modules with a data bus while excluding failed computer modules from communication with the data bus. A control means with each computer module determines the operational/failure status of the computer modules, and an adaptive means connects selected operational computer modules in a desired interconnection mode or configuration with the data bus in response to the operational status of the computer modules.

The control apparatus provides adaptive or reconfigurable operation and interconnection of the plural computer modules in accordance with their operational/failure status in order to provide a fail-operational, fail-safe operation, tolerating three successive module failures. When used with four computer modules, the control apparatus of the present invention permits operation in the following interconnection modes: four-way voting, wherein each computer module is performing the same operation, with one or more control apparatus providing voting or failure analysis to determine operational/failure status of the computer modules; three-way voting, wherein three computer modules are redundantly operating and undergoing failure analysis by voting of one or more control apparatus, with the fourth computer module on standby status or performing other computations; two-way comparison between two of the computer modules to determine operation/failure status, with the remaining two computer modules being either also in a comparison mode or individually doing other computations; or selector operation with each computer performing non-redundant computations.

A computer module is determined to be failed whenever the self-testing equipment of the computer module indicates that the computer module is failed, or alternatively when a majority of control apparatus with other computer modules indicate that the computer module is failed.

The control means of each control apparatus of the present invention includes P-matrix means for storing the operational/failure status of the computer modules; R-matrix means for storing the desired interconnection mode of the adaptive means; and S-matrix means for storing the error status of data to the adaptive means.

Intercommunication and control operations between the computer modules, data buses, control means, and adaptive means are performed in an input-output processor of the control apparatus.

The input-output processor and computer modules can then be programmed to reconfigure the computer system to continue operational in the event of a failure in one or more of the computer modules.

DESCRIPTION OF PREFERRED EMBODIMENT

Figure 1:
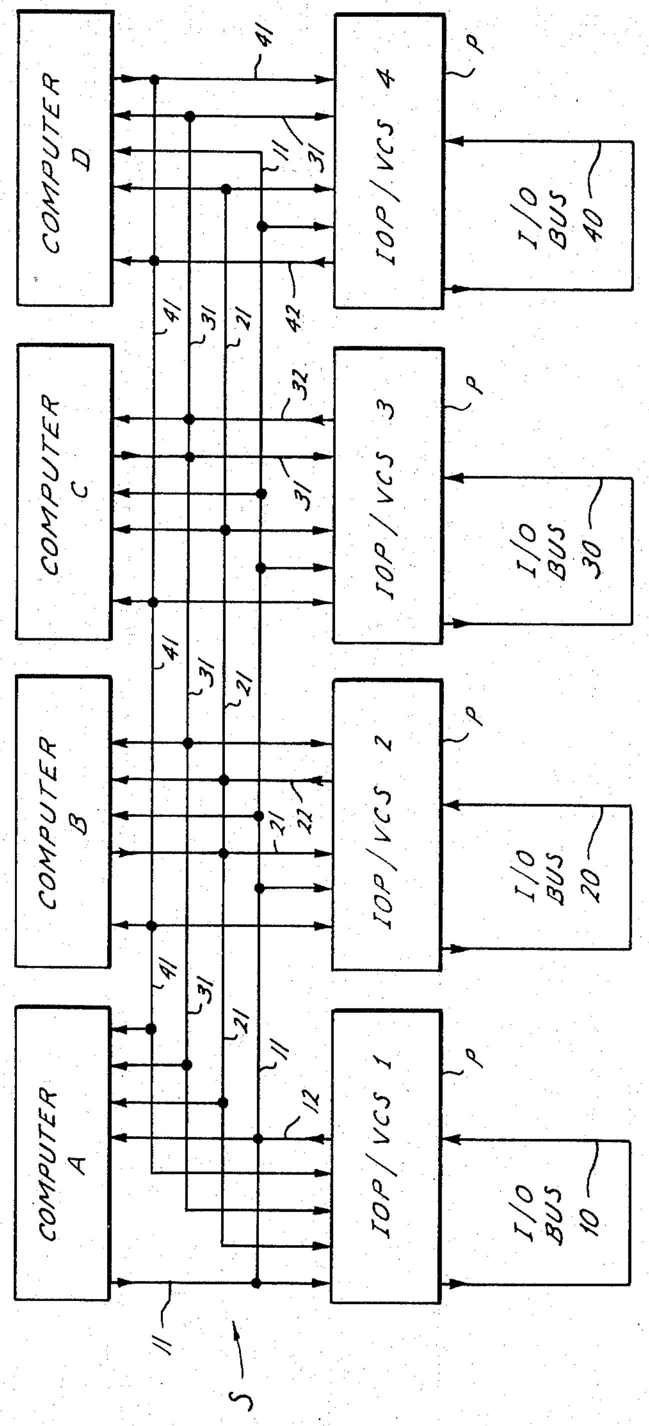
FIG. 1 is a schematic electrical circuit diagram of the interconnection of a plurality of computer modules with the control apparatus of the present invention.

In the drawings, the letter S designates generally a computer system for use with the present invention. The computer system S includes four computers: a computer A, a computer B, a computer C, and a computer D. Each of the computers A, B, C, and D are general purpose digital computers and are connected to individual input/output (I/O) data busses 10, 20, 30, and 40, which interface with local processors of external subsystems. The computers A, B, C, and D are interconnected with the data busses 10, 20, 30, and 40, in a manner to be more evident hereinbelow, to provide the fault tolerant, fail-operational, fail-safe operation of the computer system S by the use of adaptive voting.

The computers A, B, C, and D are general purpose digital computers of the conventional type. Accordingly, each of the computers includes a processor module, or arithmetic unit, a memory module or storage unit, and self-test or self-repairing components, such as for example the type set forth in U.S. Pat. No. 3,348,197. Further, the computers contain a parallel input/output channel providing rapid data transfer with other computer systems and mass memory storage systems.

The computers A, B, C, and D may further have input/output (I/O) processors of the conventional type for providing intercommunication with the other computers and with a control apparatus P of the present invention. Alternatively, as will be set forth hereinbelow, the control apparatus P may be of the type having an input/output processor (IOP) therewith for providing intercommunication between the computers, the control apparatus P, and the I/O busses 10, 20, 30, and 40. The computer A provides data and commands to its associated control apparatus P and to the computers B, C, and D over an output channel 11. The computer A receives data and commands from its associated control apparatus P over an input channel 12. Further, the computer A receives data and commands from the computers B, C, and D over their respective output channels 21, 31, and 41, respectively. Further, the control apparatus P with each of the computers A, B, C, and D receives data and commands from each of the output channels 11, 21, 31, and 41 of the computers A, B, C, and D.

Further, the control apparatus P with the computers B, C, and D, respectively, provides data and commands over an input channel 22, 32, and 42, respectively, to the computers B, C, and D.

The adaptive control apparatus P of the present invention interconnects operational ones of the self-testing computers A, B, C, and D, hereinafter referred to as computer modules, as will be set forth hereinbelow with their respective data buses while excluding failed or inoperational computer modules from communication with the data bus.

Each of the control apparatus P includes a Voter-Comparator-Switch (VCS in the accompanying drawings) including a control unit 100 (FIG. 2) and an adaptive switching unit including a buffer shift register and input switching unit 120 and a voter-comparator-selector and buffer register unit 140. The control apparatus P also can include an Input/Output Processor (IOP in the accompanying drawings). As has been previously set forth, the IOP may be the Input/Output unit in the general purpose computer, or may be a special IOP according to the present invention.

As will be set forth in detail hereinbelow, the VCS is capable of operating on redundant data in a majority voting or a comparison mode, thereby performing a redundancy reduction of either 4:1, 3:1, or 2:1, or the VCS may operate independently on non-redundant data. The VCS is adaptive in that it may be switched into different operating modes as desired, and also in that failures in the computer system S are detected and removed from the computer system S on the basis of adaptive majority logic.

The IOP functions as an independent processor operating under a stored program in the memory of the computer module with which the particular IOP is associated, and is capable of interfacing with the internal memory with such computer via a memory bus as will be set forth hereinbelow. The IOP has three input/output functions which are classified as follows:

a. Type 1, for computer-to-computer communication;
b. Type 2, for computer-to-external subsystem communication; and
c. Type 3, for computer-to-parallel channel communication.

Tyep 1 channel communications are bit serial-word serial. The channels are completely independent from each other so that the IOP of a particular computer module may be simultaneously receiving information from IOPs with the other three computers and sending information to such other IOPs on its Type 1 output channel. The information on the Type 1 channels may be either data or commands, and may be destined for the IOP or the VCS. Likewise, the information sent out on the Type 1 channel may originate from the IOP or from the VCS in the control apparatus P.

Type 2 channel communications are bit serial-word serial and provide data and commands from the computer module to the associated I/O data bus 10, 20, 30, or 40, as the case may be that connects the computer system S to various external subsystems. The transfer of data over the Type 2 channel is under control of the IOP, and external subsystems, as will be set forth hereinbelow, communicate with the IOP only when permitted to do so by the IOP.

As has been previously set forth, the Type 3 channel is used for communication to mass memory storage devices and other devices requiring rapid data transfer with the computer system S. As has been set forth, the Type 3 channel operates under control of the computer module for rapid data transfer purposes.

The IOP operates upon receipt, as will be set forth hereinbelow, and decoding of a command and/or a control word from the memory of the computer module. The commands are stored in the memory of the computer module and are called forth from the computer module by the IOP. Control words may be stored in the memory of the computer module, or may be received from other computer modules in the system S over the Type 1 channel. The control words are executed when specified by a command or when received over the Type 1 channel.

The control words cause the IOP to operate, in a manner to be set forth hereinbelow, to carry out the information transfer and intercommunication operations of the computer system S, including data transfer between computer modules, data transfer between computer modules and external subsystems, and also data transfer between computer modules and control apparatus P.

VOTER-COMPARATOR-SWITCH (VCS)

Since the VCS for each of the control apparatus P is like in structure and function to the others, differing only in the input channels and output channels associated with the control apparatus P for such VCS, only the VCS for the computer module D will be set forth in detail, it being understood that the VCS for each of the other computer modules B, C, and A are like in structure and function thereto.

Figure 2:
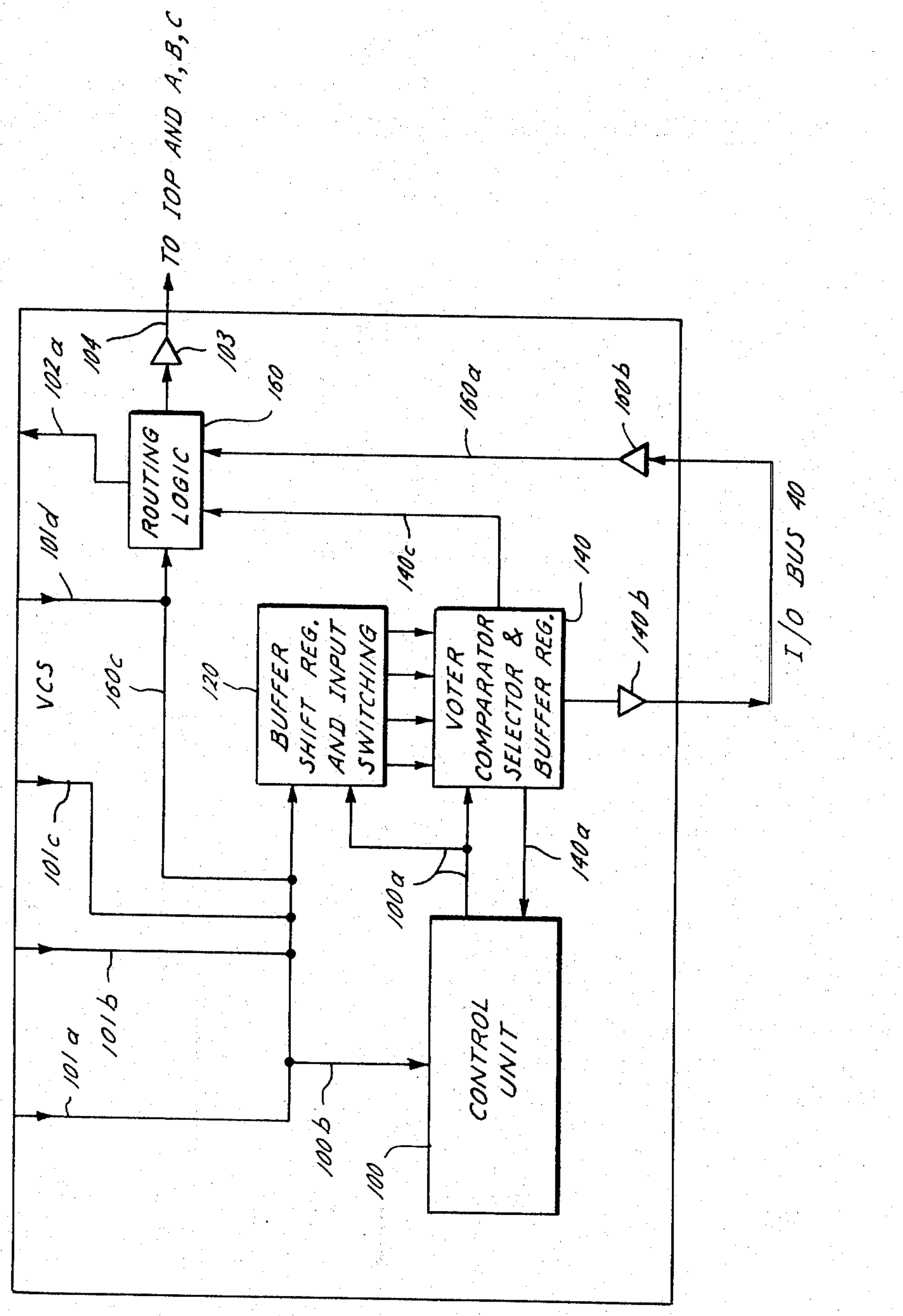
FIG. 2 and FIG. 3 are schematic circuit diagrams of the control means and adaptive means of the apparatus of the present invention.

Incoming data and commands from the other three computer modules are received in the IOP of the apparatus P, in a manner to be more evident hereinbelow, at the Type 1 input channels thereof and are furnished by the IOP over data buses conductors 101*a*, 101*b*, and 101*c* to a data bus 100*b* of the control unit 100 and the buffer shift register 120 in the VCS (FIG. 2). An internal channel in the IOP provides commands and data from the computer module D over a conductor or data bus 101*d* to the control unit 100 and the buffer shift registers 120. It should be understood that the terms conductor and data bus when used hereinbelow are used interchangeably.

The conductors 101*a*, 101*b*, 101*c*, and 101*d* are further connected to a routing logic unit 160 in the VCS in order that the data and commands from the voter-comparator-selector 140 and from the I/O data bus 40 may be switched and routed to the desired destinations. An output conductor 102*a* provides electrical communication between the routing logic unit 160 and an internal memory within the computer module D through the IOP of the control apparatus P associated with such computer module.

A line driving amplifier 103 is electrically connected to the routing logic unit 160 and provides a connection over a conductor 104 to the IOP in order that Type 1 output channels from the IOP may provide data over the output channel 42 from the control apparatus P to the other computer modules.

The control unit 100 of the VCS is electrically connected by an output conductor 100*a* to the buffer shift register and input switching unit 120 and to the voter-comparator-selector and buffer register unit 140 in order to control the operation thereof, as will be more evident hereinbelow. The voter-comparator-selector unit 140 is electrically connected by a conductor 140*a* to the control unit 100 in order to provide information as to the status of the unit 140. The voter-comparator-selector unit 140 is further electrically connected to a line-driving amplifier 140*b* in order to provide an output signal to the I/O data bus 40 in order that the data from the computer system S may be furnished to external subsystems for use thereby. An input conductor 160*a* electrically connects a line-receiving amplifier 160*b* to the routing logic unit 160 in order that incoming data from the I/O data bus 10 may be switched through the routing logic unit 160 to the appropriate receiving channels. Further, a conductor 140*c* electrically connects the voter-comparator-selector 140 to the routing logic unit 160 in order that the output fo the voter-comparator-selector unit 140 may be also provided over the Type 1 channels to the other computer modules. An input conductor 160*c* electrically connects the conductors 101*a*, 101*b*, 101*c*, and 101*d* to the routing logic unit 160 in order to provide the incoming data to such routing logic unit.

Considering the VCS more in detail (FIG. 3), the components and units thereof will be set forth and described in detail (FIGS. 4–9) hereinbelow.

Figure 3:
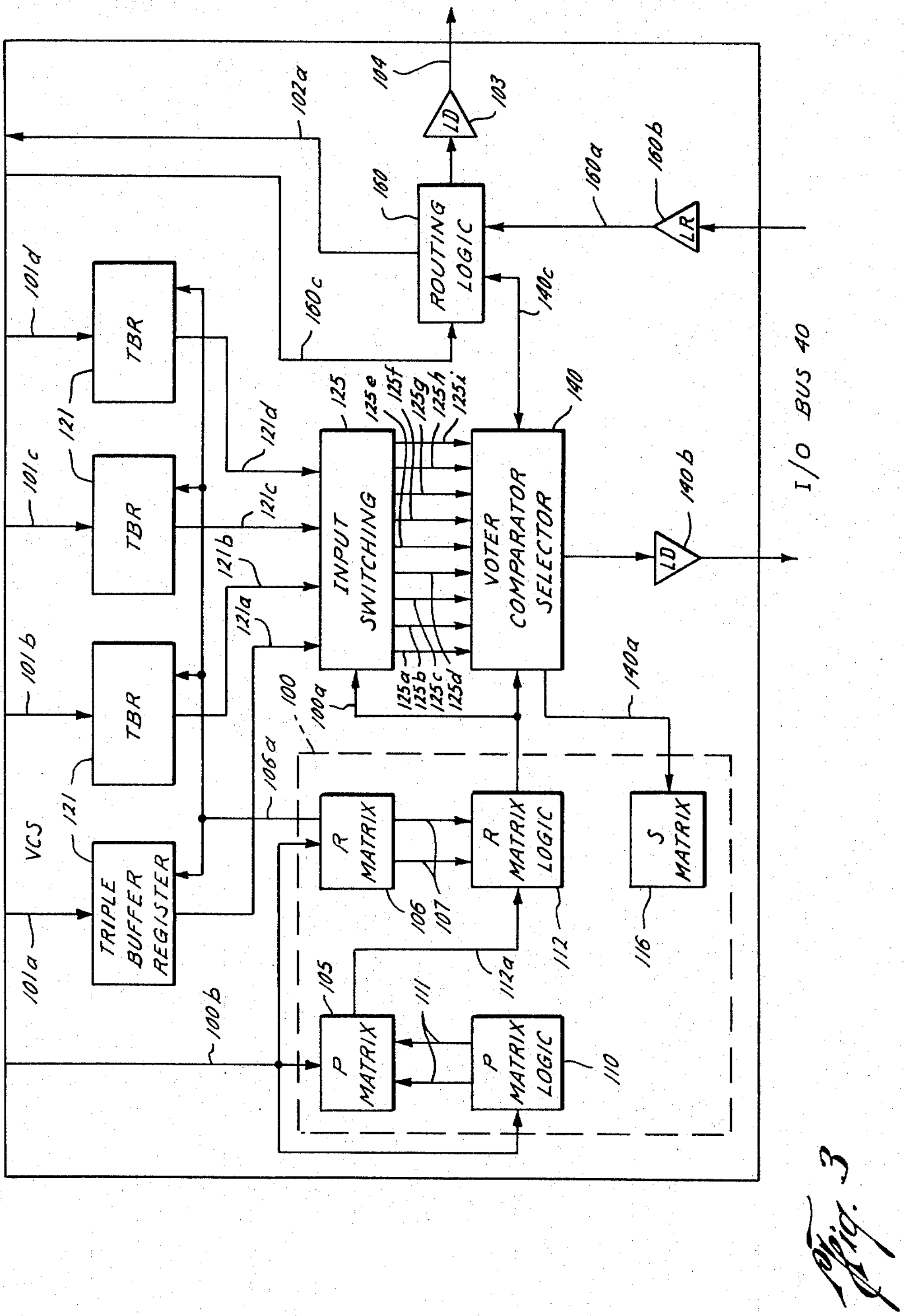
Figure 4:
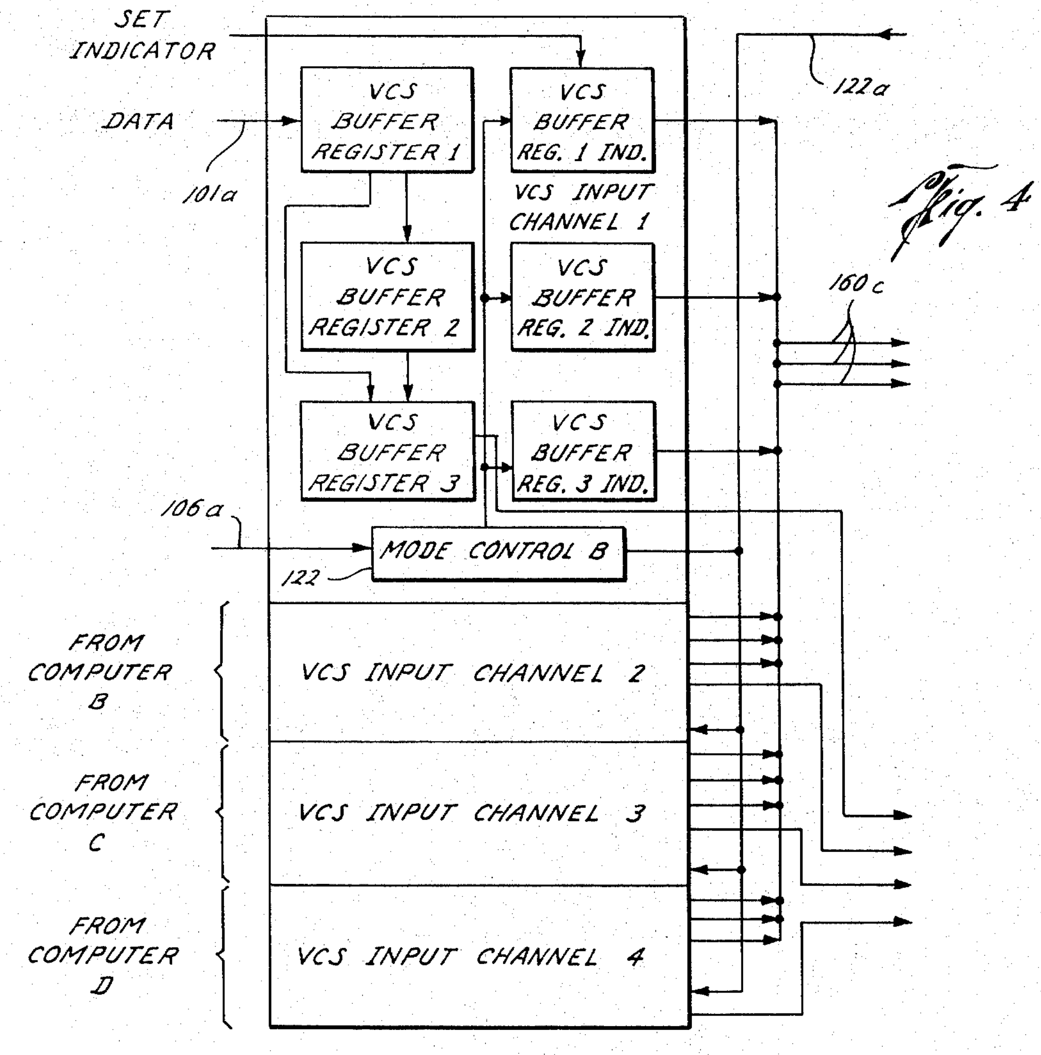
FIGS. 4, 5, 6, 7, 8, 8A, 8B, 8C, and 9 are detailed schematic electrical circuit diagrams of subsystems of the control means and adaptive means shown in FIGS. 2 and 3.
Figure 5:
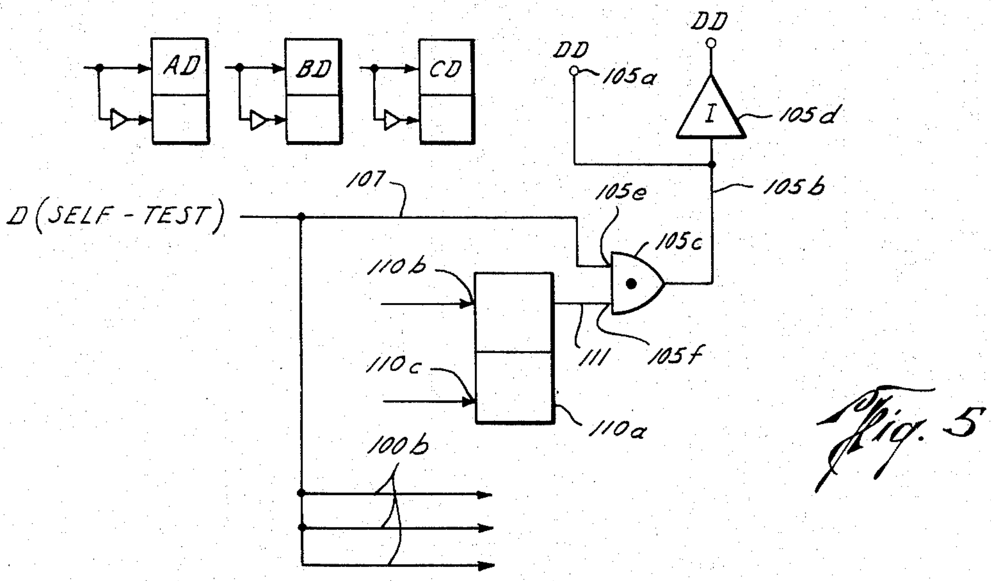
Figures 6, 7:
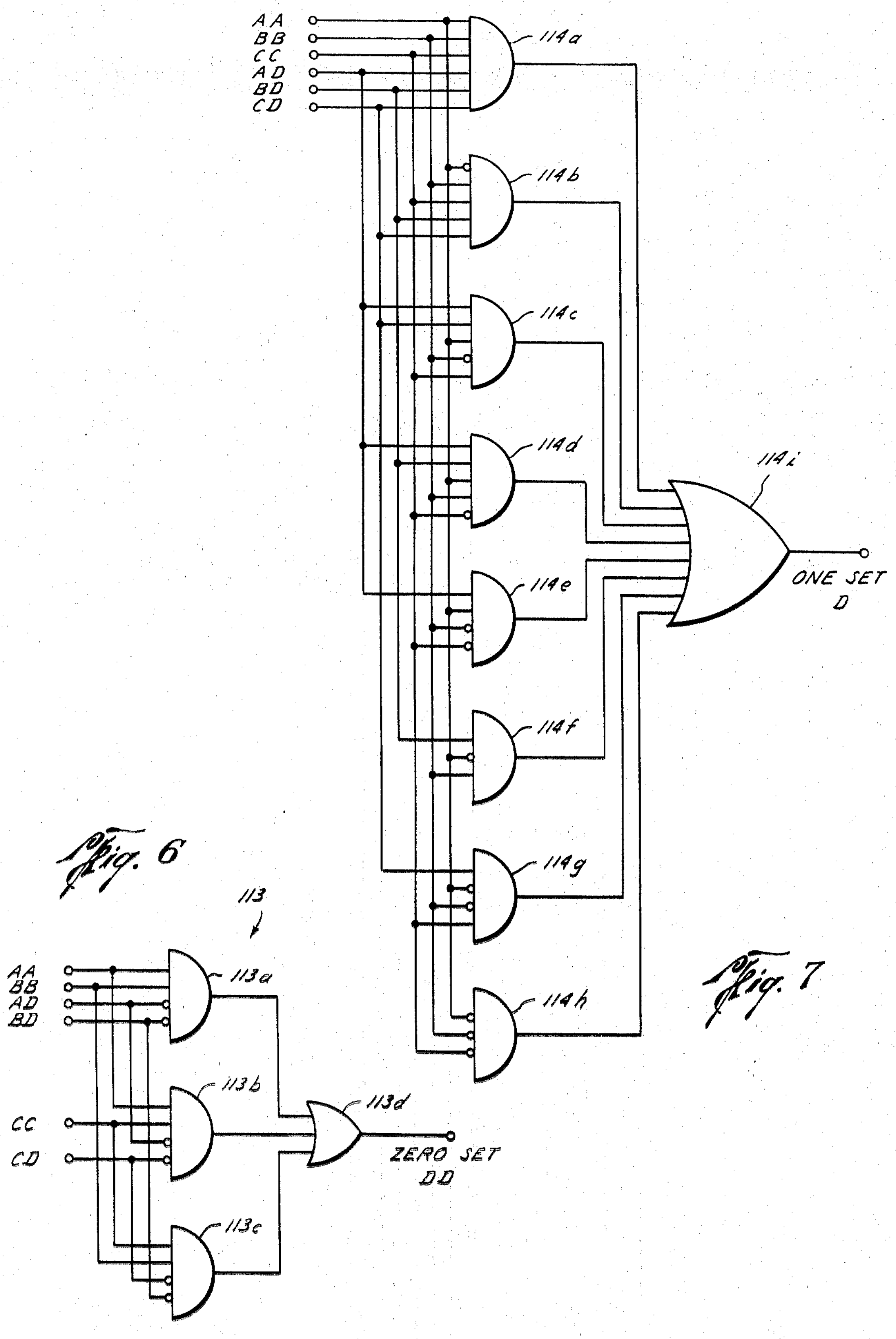

Triple Buffer Registers (FIGS. 3 and 4)

A plurality of buffer shift registers 121 are provided, each being connected with an individual one of the input conductors 101*a*, 101*b*, 101*c*, and 101*d* in the VCS. The buffer shift registers 121 together with an input switching unit 125 (FIG. 3) comprise the buffer shift register and input switching unit 120 (FIG. 2).

The buffer shift registers 121 in the VCS provide bit synchronous data to the input switching unit 125 and allow for a word time for the data from the computer modules through the IOP to be out of synchronization as much as one-half word. In this manner, the computer modules need not be operated in bit synchronization when operating in the voting or comparison modes to be set forth hereinbelow.

An output conductor 121*a* electrically connects the buffer shift register 121 with the input switching unit 125 to provide such input switching unit with the data from computer module A. In a like manner, conductors 121*b*, 121*c*, and 121*d*, respectively, provide synchronized data from computer modules B, C, and D present on the input conductors 101*b*, 101*c*, and 101*d* to the input switching unit 125.

An output conductor 106*a* from an R-Matrix 106 in the control unit 100 of the VCS provides control signals to the buffer shift registers 121 (FIG. 3) to control presentation of the data from the buffer shift registers 121 to the input switching unit 125.

Each of the buffer shift registers 121 is like in structure, differing in function only in the particular computer module to which such buffer register is connected. Hence, buffer shift register 121 receiving data from computer module A is set forth in detail (FIG. 4), while the buffer shift registers 121 for data from computer modules B, C, and D are designated as "VCS Input Channels" 2, 3, and 4, respectively (FIG. 4). Considering now the details of the buffer shift register 121, incoming decoded data is received from an input buffer register in the IOP, as will be set forth hereinbelow, over a bus 101*a* in the buffer register 121 under control of a mode control unit 122. The mode control unit 122 receives signals over a bus 106*a* from the control unit 100 indicative of the proper routing destinations of the data in the buffer shift register 121 in accordance with the operating mode of the VCS, whether four-way voting, three-way voting, comparison or selection. The mode control circuit 122 further receives signals over a bus 122*a* from the routing logic unit 160 to cause transfer of the data between a plurality of buffer registers designated VCS buffer registers 1, 2, and 3, respectively, when a previous VCS operation has been completed or when it is desired to advance data to the VCS from the buffer register 121.

The VCS buffer register 1 receives the data from the IOP in word parallel format over the conductor 101*a*. When the next word is ready for loading into the buffer register 1, the word currently present in the register 1 is transferred to buffer register 2. Similarly, the word in buffer register 2 is transferred to buffer register 3. Each of the registers 1, 2, and 3 in TBR 121 have associated therewith an indicator flip-flop which is set by the read-in of a complete word of data into the associated buffer register. The buffer register indicators for the buffer register 1, 2, and 3 are electrically connected over the conductors 160*c* to the routing logic unit 160 (FIG. 9) in order that the movement of data through the buffer registers 121 may be controlled by the mode control unit 122 in accordance with the desired voting mode of the voter-comparator-selector unit 140.

The buffer register 1 indicator further receives a "Set Indicator" input signal from the IOP when a complete data word has been transferred into the buffer register 1. Upon receipt of the "Set Indicator" input signal, the mode control circuit 122 tests the signals present on the input line 106*a* to determine the mode of operation of the buffer register 121. The mode of operation is determined by the signal present on the conductor 122*a* from the Routing Logic Unit 140.

As will be set forth hereinbelow, control circuitry in the Routing Logic Unit 140 provides signals over the conductor 122*a* to the mode control circuit in order to cause the buffer registers 1, 2, and 3 to advance data therethrough. Receipt of a "VCS advance Register Signal" on the conductor 122*a*, formed in a manner to be set forth hereinbelow, causes the buffer register 1 to data to the upper registers 2, or 3 in accordance with the state of the "VCS Advance Register Signal." A true or logical "1" signal as a "VCS Advance Register" signal causes the data to be transferred from the buffer register 1 directly to the buffer register 3, advancing past the intermediate buffer register 2 under control of the mode control unit 122. The "VCS Advance Register" signal is a true signal when the VCS is operating as a three-way voter. This is due to the requirement that only three computer modules be operated in bit synchronization during three-way voting operations. When operating in three-way voting operations, failure of the computer modules to achieve synchronization within the limit set forth hereinabove causes an error indication from the IOP.

Similarly, when operating in the four-way voting operation, four computer modules are required to operate in synchronization, thereby requiring that the buffer registers 1, 2, and 3 each receive data since data synchronization within such limits is now required.

Further, when operating as a two-way comparator, only the buffer register 1 receives data, since synchronization between only two computer modules is required.

Thus, it can be seen that the buffer registers 121 permit synchronization between data from each of the computer modules, which are not synchronized with respect to each other, within plus or minus two data words, in accordance with the number of computer modules furnishing data to the VCS, whether four-way voting, three-way voting, or two-way comparison.

The following chart provides a listing of the number of flip-flops necessary to implement the buffer registers 121 for each of the four buffer registers 121 in a VCS with each computer module:

TRIPLE BUFFER REGISTER (4 required per VCS)

| | |
|---|---|
| VCS Buffer Register **1** | 17 Bits |
| VCS Buffer Register **2** | 17 Bits |
| VCS Buffer Register **3** | 17 Bits |
| VCS Buffer Register **1** Indicator | 1 Bit |
| VCS Buffer Register **2** Indicator | 1 Bit |
| VCS Buffer Register **3** Indicator | 1 Bit |
| Mode Control B | 4 Bits |

Control Means

The control means or control unit 100 (FIGS. 3 and 5—7) operates on the principle of adaptive majority logic, as has been previously set forth. The control unit 100 controls the operating mode of the voter-comparator-selector 140 to cause same to operate in the desired voting mode, whether four-way voting, three-way voting, two-way comparison, or selection. Further, the control unit 100 in each VCS determines the operational/failure status of each of the computer modules A, B, C, and D. The operational/failure status of the computer modules is stored in each control unit in a P-matrix unit 105.

A P-matrix logic unit 110 (FIG. 3) derives the operational/failure status of each of the computer modules and indicates a failure status for a particular computer module when either of the following two conditions occur:

a. a computer module is indicated as failed when self-testing equipment, of the type previously set forth, in the computer module indicates such computer module to be failed;

b. a computer module is indicated as being in a failure status whenever a majority of the computer modules currently voting, as will be set forth hereinbelow, indicates such particular computer module is in a failure status.

The P-matrix logic unit 110 furnishes the operational/failure status so derived over data buses 111 to the P-matrix unit 105.

Accordingly, the P-matrix unit 105 associated with a particular computer module contains in storage elements therein, as will be set forth hereinbelow, that particular computer module's failure status opinion of the other computer modules and the majority decision as to the failure status of each computer module, arrived at upon a basis of adaptive majority logic.

An R-matrix unit 106 stores in memory elements therein the desired interconnection mode of the voter-comparator-selector unit 140, whether four-way voter, three-way voter, two-way comparator, or selector. Further, the R-matrix storage unit 106 furnishes electrical signals over data buses 107 to an R-matrix logic unit 112 (FIG. 3) which operates under a majority decision rule as to the selection of the mode of operation for the voter-comparator-selector unit 140. Further, the R-matrix logic unit 112 is adaptive in that information as to the operational/failore status of the computer modules is used by the R-matrix logic unit 112 to determine which of the computer modules are in the failure status, and accordingly, whose information in the R-matrix unit 106 should be disregarded or ignored.

The P-matrix storage unit 105 and the R-matrix storage unit 106, as well as the P-matrix logic unit 110 are electrically connected to the input conductor **100*b* and receive data from the other computer modules in order to store therein the opinion of other computer modules as to the operational/failure status of the particular computer module with which each control unit 100** is used.

The control unit 100 further includes an S-matrix storage unit 116 which stores therein error status of input data to the adaptive voter-comparator-selector unit 140. Unit 140 provides such error status to the S-matrix storage unit 116 over a conductor bus **140*a*,** as has been previously set forth.

Further, the information content of the P-matrix storage unit 105, the R-matrix storage unit 106, and the S-matrix storage unit 116 is provided to the IOP for transfer to similar storage units in other computer modules as will be set forth hereinbelow.

P-matrix

As has been previously set forth, the P-matrix storage unit 105 contains information as to the operational/failure status of each computer module. The P-matrix storage unit 105 is a four-by-four matrix of bistable digital memory devices. Each of the memory devices in the P-matrix bears a designation indicative of the information content therein as follows: each memory storage element in the P-matrix bears a unique designation *i.j.*, wherein *i* designates the particular computer module testing a computer *j*. A logic "1" is used to indicate that computer i tests computer *j* to be operational; whereas a logical "0" is used to designate if computer module *i* tests computer module *j* to be failed.

Thus, the row of storage elements AD, BD, CD, and DD in the P-matrix (FIG. 5), contain therein the opinion of the computer modules as to each other's operational/failure status as follows: memory element AD contains therein the operational/failure status of computer module D as determined by computer module A; similarly, the storage elements BD and CD contain therein computer module B's and computer module C's opinion as the operational/failure status of computer module D.

The information content of the storage elements AD, BD, and CD in computer module D is furnished to the P-matrix unit 105 in the control unit 100 of the computer module D by the IOP in the control apparatus P associated with the computer module D, as will be set forth hereinbelow.

The memory storage element DD in the P-matrix storage unit 105 associated with computer module D contains the operational/failure status of the computer module D determined, as will be set forth hereinbelow, in accordance with the status of self-test equipment within the computer module D as well as the majority opinion of the other computer modules as to the operational/failure status of the computer module D. The information content of the storage element DD is furnished by the IOP, as will be set forth hereinbelow, to similarly designated storage elements in the P-matrix storage units of other control apparatus P, associated with each of the computer modules A, B, and C, by being provided to the IOP over the data bus **100*b*, as is evident from FIG. 5**.

Similarly, each of the remaining rows in the P-matrix storage unit 105 in each of the control apparatus P of the present invention contain therein information derived in a like manner as to the operational/failure status of the computer modules A, B, C, and D.

Thus, it can be seen that the storage elements AA, BB, CC, and DD, representing the diagonal elements in the P-matrix storage unit represent the operational/failure status of each of the computer modules A, B, C, and D as determined by the P-matrix logic unit 110 and by the self-test equipment within the computer module. Further, the off-diagonal storage elements AB, AC, and AD represent the computer module A's opinion as to the operational/falure status of computer module B, C, and D. The storage elements BA, BC, and BD thus contain the operational/failure status opinion of computer modules A, C, and D as determined by computer module B. Further, the storage elements CA, CB, and CD contain the operational/failure status opinion of computer modules A, B, and D as determined by computer module C.

The storage element DD (not shown) is of like structure and function to the remaining fifteen bi-stable memory devices in the P-matrix such as flip-flops AD, BD, and CD (FIG. 5) and receives the operational/failure status opinion of the computer module D at an input terminal **105*a*. The input terminal 105*a* receives the signal for storage element DD over a conductor 105*b* from an AND gate 105*c*. The signal present on the conductor 105*b* is inverted by an inverter 105*d* and provided as the reverse level of the signal present on input terminal 105*a***, namely $\overline{DD}$ at the alternative input to the bi-stable storage element DD.

The AND gate 105c provides a logic "1" output signal upon receipt at an input terminal **105*b* of a logic "1" signals from the self-testing equipment in the computer module D and from an Enable DD flip-flop 110*a*. The self-testing equipment in the computer module D is connected by a conductor 107 to the input terminal 105*e***.

A second input **105*f* of the AND gate 105*c* is electrically connected over the data bus 111 to the Enable DD flip-flop 110*a* at the P-matrix logic unit 110 of the control unit 100. The Enable DD flip-flop 110*a* provides a logic "1" output signal over the conductor 111 upon receipt at an input terminal 110*b* of a "One Set DD" signal formed in the P-matrix logic unit 110 in a manner to be set forth hereinbelow. Further, the enable DD flip-flop 110*a* provides a logic "0" over the data bus 111 upon receipt at an input terminal 110*c* of a "Zero Set DD" signal formed in the P-matrix logic unit 110** in a manner to be set forth hereinbelow.

P-matrix Logic Unit

The P-matrix logic unit 110 in each control unit 100 for a control apparatus P associated with a particular computer module derives for the diagonal element in the P-matrix storage unit 105 the adaptive majority vote as to the operational/failure status of such particular computer module.

The adaptive majority logic vote takes the form of the "Zero Set DD" and the "One Set DD" signals furnished to the Enable DD flip-flop 111 for the P-matrix storage unit 105 used in connection with the computer module B as has previously set forth.

As has been previously set forth, the P-matrix storage unit 105 receives the operational/failure status signals from P-matrices and from the IOP and stores such operational/failure status therein. The operational/failure status signals so stored are furnished to the P-matrix logic unit 110 over a data bus 111 (FIG. 3).

The "One Set DD" and "Zero Set DD" signals furnished to the enable DD flip-flop are derived in accordance with the following Boolean logic equations:

$$\text{Zero Set DD} = (AA)(BB)(\overline{AD})(\overline{BD}) + (AA)(CC)(\overline{AD})(\overline{CD}) + (BB)(CC)(\overline{BD})(\overline{CD})$$

$$\text{One Set DD} = (AD)(BD)(CD)(AA)(BB)(CC) + (BD)(CD)(\overline{AA})(BB)(CC) + (AD)(CD)(AA)(\overline{BB})(CC) + (AD)(BD)(AA)(BB)(\overline{CC}) + (AD)(AA)(\overline{BB})(\overline{CC}) + (BD)(\overline{AA})(BB)(\overline{CC}) + (CD)(\overline{AA})(BB)(CC) + (\overline{AA})(\overline{BB})(\overline{CC})$$

Similar logic equations for the "Zero Set AA," "One Set AA", "Zero Set BB", "One Set BB", "Zero Set CC", and "One Set CC" signals are evident to those of ordinary skill in the art from the above equations for such signals for diagonal element DD in the P-matrix.

Such equations can be also derived by substituting the letter D each time it appears in the above equations for the letter A, B, or C representing the particular diagonal element to be set in accordance with the adaptive logic of the P-matrix logic unit 110 in the control unit 100.

Examination of the "Zero Set DD" equation set forth hereinabove shows that the diagonal element DD in the P-matrix storage unit 105 is set to logical "0" indicating a failure status in computer modulus B whenever a majority, or two of the three remaining computer modules and their associated control units 100, indicate failure status in the computer module D. As has been previously set forth, the diagonal storage element DD is also driven to a logical "0" if self-testing equipment in the computer module D indicates a failure status and furnishes a logical "0" signal to the AND gate **105*c***.

A suitable example of a digital logic circuit for deriving each of the "Zero Set DD" signal and the "One Set DD" signal will now be set forth. However, it should be understood that alternative digital logic circuits equally capable of forming such signals are readily evident to those of ordinary skill in the art based upon the digital logic equations for forming such signals previously set forth. A suitable reference setting forth the manner to derive digital logic circuits to perform digital logic functions in accordance with Boolean equations is, for example, "Logical Design of Digital Computers", Phister, John Wylie & Sons, Inc., Publishers, New York, 1958. Thus, the remainder of the digital logic circuitry will be set forth in Boolean algebra format, it being understood that design of the AND and OR gates for forming outputs in accordance with such equations can be performed as taught in the Phister reference previously set forth.

The zero Set DD circuit 113 (FIG. 6) of the P-matrix logic unit 110 includes three AND gates 113*a*, 113*b*, and 113*c*. Such AND gates are designated in conventional digital circuit design format, with a circle at an input thereto indicating that the input signal is inverted upon application to such AND gate. Thus, the AND gate 113a provides a logical "1" output when the first term of the "Zero Set DD" signal equation previously set forth is satisfied by the presence of a logical "1" as each of its terms. The input signals are furnished to the P-matrix logic unit 110 from the P-matrix storage unit 105 and the IOP, as has been previously set forth.

Similarly, the AND gate 113b forms a logical "1" when the inputs applied thereto are each logical "1", satisfying the second term of the "Zero Set DD" equation previously set forth. In a like manner, the AND gate 113*c* forms a logical "1" output signal when each of the input signals applied at the inputs thereof are logical "1" satisfying the third term of the "Zero Set DD" signal.

An OR gate 113d is electrically connected to the outputs of the AND gates 113*a*, 113*b*, and 113*c*, forming a logical "1" output in response to the presence of a logical "1" present at output of one or more of the AND gates 113*a*, 113*b*, and 113*c*.

Accordingly, it can be seen that the Zero Set DD circuit 113 provides a logical "1" output signal in response to input status signals from the P-matrix storage unit 105 in compliance with the "Zero Set DD" storage equation previously set forth. Such "Zero Set DD" signal is furnished to the input terminal 110*c* of the enable DD flip-flop 110*a*, as has been previously set forth, in order to indicate that the adaptive majority logic of the P-matrix logic unit 110, as indicated by a majority of the computer modules has tested computer module D as being in a failure status.

An One Set DD circuit 114 (FIG. 7) receives input signals, as is evident from the drawings, from the P-matrix storage unit 105 and forms an output signal in accordance with the "One Set DD" equation previously set forth. Each of a plurality of AND gates 114*a*, 114*b*, 114*c*, 114*d*, 114*e*, 114*f*, 114*g*, and 114*h* receive inputs at input terminals thereof in accordance with the "One Set DD" signal equation previously set forth. The gates 114*a* through 114*h* form a logical "1" output signal at an output terminal thereof when the signal present at each of the input terminals, including the inverted ones indicated by a circle at such input, as has been previously set forth with respect to the circuit 113, bears a logical "1" level. Thus, each of the eight AND gates 114*a* through 114*h* form an output signal in accordance with each of the eight terms of the "One Set DD" signal equation previously set forth.

An OR gate 114*i* receives the output from each of the AND gates 114*a* through 114*h* and provides a logical "1" output signal upon the appearance of a logical "1" at the output terminals of at least one of the gates 114*a* through 114*h*. Accordingly, it can be seen that the One Set DD circuit 114 furnishes an output signal to the input terminal 110*b* of the enable DD flip-flop 110*a* indicating that the adaptive majority logic of the P-matrix logic unit has voted that the computer module D is in an operational status.

The operational/failure status of the computer modules so determined in the P-matrix logic unit 110 and indicated at the enable flip-flops thereof is provided over the data bus 111 to the P-matrix storage unit 105, as has been previously set forth in order that the storage elements in the P-matrix storage unit 105 may store the operational/failure status of the computer modules.

An input conductor 112*a* provides the operational/-failure status as represented by the diagonal storage elements in the P-matrix storage unit 105 to the R-matrix logic unit 112 which, as will be set forth hereinbelow, performs adaptive majority logic on the desired operational status thereof as presented by the R-matrix 106, in order to form output signals provided over the conductor 100*a* to the input switching unit 125 and voter-comparator-selector 140.

The input switching unit 125 and voter-comparator-selector 140 adapt themselves responsive to such signals from the control unit 100 and connect selected operational computer modules in a desired interconnection mode with the data bus associated with the particular control control apparatus P.

The output of the P-matrix storage unit to the R-matrix logic over the conductor 112*a* indicating the operational/failure status of the computer modules is designated as follows: X*i* defined as an operational state of computer module *i;* and Zi is defined as an indication of a failure status of computer modules i. Accordingly, for computer module D, XD=DD; and ZD=$\overline{DD}$.

R-Martrix

The R-matrix storage unit 106 receives data over the data bus 100*b* from the IOP in each of the computer modules A, B, C, and D indicative of the desired interconnection mode, whether four-way voting, three-way voting, two-way comparison, or selection, from each of the four computer modules, as has been previously set forth.

The R-matrix storage unit 106 is, like the P-matrix storage unit 105, a four-by-four matrix of bi-stable memory devices storing therein the indications of the desired interconnection mode from each of the four computer modules. The four horizontal rows in the four-by-four matrix of storage elements in the R-matrix storage unit 106 each represent a particular computer module's interpretation of the participation of itself and each of the remaining computer modules in the computer system S. Thus, the D row in the R-matrix storage unit includes four bi-stable memory devices each having a logical "1" output if the computer module D transmits a signal indicating that each computer module in the computer system S is indicated by the computer module D as the desired interconnection mode, in other words four-way voting, for the computer system S over the I/O buses with the external subsystems.

The signals indicating the desired interconnection mode of the computer modules are furnished to the R-matrix from the IOP as has been previously set forth. A computer module that is not participating in the particular interconnected mode is required by signals from the remainder of the operational computer modules to insert all logical "0" in its particular row and to furnish such logical "0" through its IOP to the IOP's in R-matrices in the other computer modules.

Thus, it can be seen that each of the four rows, namely the A row, the B row, the C row, and the D row in the R-matrix storage unit of each of the control units 100 presents at the output terminals of the bi-stable memory devices in such row in the R-matrix storage unit 106 a four bit binary number. Thus, as has been previously set forth, should the computer module D be presently indicating that the desired interconnection mode is four-way voting, each memory element in the D row in the R-matrix storage unit 106 will have a logical "1" at the output terminal thereof, or binary "1111". Binary "1111" is also equivalent to decimal 15 as is known.

For ease of reference in discussion of the R-matrix logic unit 112 to be set forth hereinbelow, the status of each row in the R-matrix storage unit 106 shall be defined as a row status signal riN wherein *i* corresponds to the particular row in the R-matrix storage unit, whether A, B, C, or D designating the desired interconnection mode as determined by the particlar computer modules A, B, C, or D, respectively; and N represents the decimal equivalent of the binary number or output status signal from each of the four bi-stable memory devices in such particular row.

As an example, when the D row in the R-matrix storage unit 106 is indicating the desired interconnection mode of the computer modules A, B, C, and D to be four-way voting, providing a binary "1111" at the output of the four bi-stable memory devices, as has been previously set forth, the row status signal, using the above-set forth definition for the D row is: rD15.

When the D row in the R-matrix storage unit 106 is indicating that the computer modules B, C, and D should be operating in a three-way voting interconnection mode, the four bi-stable memory devices in the D row of the R-matrix storage unit 106 will be in the following status: memory unit AD will be in a logical "0" condition at the output terminal, whereas memory units BD, CD, and DD will be in a logical "1" output status. Thus, it can be seen that the status condition of the D row for three-way voting between computer modules B, C, and D is binary "0111" or decimal 7. Accordingly, the stauts indicator for the D row for the three-way voting between computer modules B, C, and D, determined in the previously set forth manner, is rD7.

As has been previously set forth, the conductor or data bus 107 provides the output indications from the bi-stable memory elements in the R-matrix storage unit 106 to the R-matrix logic unit 112.

R-Matrix Logic

The R-matrix logic unit 112 receives input signals from the P-matrix storage unit 105 indicative of the operational/failure status of the computer modules in the computer system S, and further receives input signals over the conductors 107 from the R-matrix storage unit 106 indicative of the desired interconnection mode of the computer modules. The R-matrix logic unit performs the adaptive majority logic on the input signals so received in order that the majority of the operational computers (as defined by the signals XA, XB, XC, XD indicating an operational status of such computers as well as the signals ZA, ZB, ZC, and ZD indicative of failure status in the computer modules) agree that a particular interconnection mode as represented by the status of the R-matrix storage unit 106 is established in the voter-comparator-selector, as will be set forth hereinbelow.

The R-matrix logic unit 106 forms an output signal 4V and provides same to the input switching unit 125 and the votor-comparator-selector 140 in response to a status indication in the R-matrix storage unit four-way voting is the desired interconnection mode and an indication from the P-matrix storage unit 105 that each of the four computer modules is in an operational status. Thus, the R-matrix logic unit 112 contains suitable logic and gates to form an output signal 4V in accordance with the following Boolean logic equation:

4V = (rA15) (rB15) (rC15) (XA) (XB) (XC) + (rA15) (rB15) (rD15) (XA) (XB) (XD) + (rA15) (rC15) (rD15) (XA) (XC) (XD) + (rB15) (rC15) (rd15) (XB) (XC) (XD)

The term rA15, rB15, rC15 and rD15 are defined in accordance with the row status indications defined hereinabove with respect to the R-matrix storage unit 106.

The R-matrix logic unit 112 forms an output signal 3V indicating a three-way voting status between computer modules A, B, and C in suitable logic gates, as set forth in the Phister reference previously set forth hereinabove, in accordance with the following Boolean logic equation:

3V/ABC = (rA14) (rB14) (rC14) (XA) (XB) (XC) + (rA14) (rB14) (XA) (XB) (rDO+ZD) + (rA14) (rB14) (XA) (XC) (rDO+ZD) + (rB14) (rC14) (XB) (XC) (rDO+ZD)

Analogous logic equations apply for three-way voting between computer modules A, B, and C; computer modules A, C, and D; and computer modules B, C, and D.

Te R-matrix logic unit 112 forms an output signal 2CO indicating that two-input comparator operation of the votor-comparator-selector unit 140 between the outputs of computer modules A and B is desired with suitable gates and logic circuitry in accordance with the following Boolean logic equation. The gates, as has been previously set forth, would be configured as set forth in the Phister reference previously referred to.

2CO/AB = (rA12) (rB12) (XA) (XB) (rCO+ZC) + (rA12) (rB12) (XA) (XB) (rDO+ZD)

Similar Boolean equations would apply to requests for two-way comparison as indicated by the signal 2CO for comparison in the voter-comparator-selector unit 140 between computer modules A and C, A and D, B and C, B and D, and C and D.

The R-matrix logic unit 112 forms an output signal S(i) indicating that a computer module i is to furnish signals to the voter-comparator-selector unit 140 for transmittal to the I/O data bus and furnishes such signal to the input switching unit 125 and the voter-comparator-selector 140. The selector signal S(A) indicating that selector operation in the voter-comparator-selector 140 of data from the computer module A is desired is formed in logic circuitry connected, in the manner disclosed in the Phister reference, to provide an output signal satisfying the following Boolean logic equation;

S(A) = (rA8) (XA) (rBO+ZB) (rCO+ZC) (rDO+ZD)

Analogous equations would apply for formation of the signals S(B), S(C), and S(D).

Thus, the R-matrix logic unit 112 provides an output signal 4V, 3V, 2CO or S(*i*) to the input switching unit 125 and the voter-comparator-selector 140 on the basis of adaptive majority decision logic as determined by the operational/failure status of the computer modules indicated by the P-matrix storage unit 105, together with the desired interconnection mode as indicated by the R-matrix storage unit 106. The output signal so formed in the R-matrix logic unit is furnished to the input switching unit 125 and the voter-comparator-selector 140 in order to control the adaptive interconnection between the computer modules and the data bus as will be more evident hereinbelow.

S-Matrix

The S-matrix storage unit 116 is a four-by-four matrix of bi-stable memory devices storing therein the error status of input data to the voter-comparator-selector unit 140, as determined by such voter-comparator-selector unit when operating in the desired interconnection mode, whether four-way voting, three-way voting, or two-way comparison.

Although a one-by-four matrix is sufficient to indicate the error status in data from the four computer modules A, B, C, or D, a four-by-four matrix of four rows is used in order that each of the computer modules may sample and reset the row assigned thereto in the matrix.

The S-matrix receives the following error signals from the voter-comparator-selector unit logic, to be set forth hereinbelow, together with output signals from the R-matrix logic 106 furnished to the voter-comparator-selector unit 140 indicating the desired interconnection mode of the voter-comparator-selector unit 140. T8e following error signals, formed in a manner to be set forth hereinbelow, are received in the S-matrix unit 116: AX, BX, CX, BX, UDVD, EX, FX, GX, SD.

The storage elements in the S-matrix indicating error status in data from computer A participating in a desired interconnection mode are set to indicate such error in accordance with the following equation:

Data Error (A) = AX+UDVD+EX[3V(ABC)+3V(ABD) +3V(ACD) ]+SD[2CO(AB)+2CO(AC) +2CO(AD) ]

Similar equations apply for the storage elements containing indications of the data errors for computer modules B, C, and D. Booleans logic equations setting forth the definition ofthe error terms furnished to the S-matrix storage unit 116 by the voter-comparator-selector unit 140 will be set forth hereinbelow.

Input Switching Unit

The input switching unit 125 (FIG. 3) receives input signals from the buffer registers 121 from each of the computer modules A, B, C, and D over the input busses 121*a*, 121*b*, 121*c*, and 121*d*, respectively, as has been previously set forth. The input switching unit 125 provides the signals from the busses 121*a*, 121*b*, 121*c*, and 121*d* to output busses 125*a*, 125*b*, 125*c*, and 125*d*, respectively, in order to furnish the data from computer modules A, B, C, and D to the voter-comparator-selector unit 140.

Further, the input switching unit 125 contains gates suitable to form output signals E, F, G, H, and I over output conductors 125*e*, 125*f*, 125*g*, 125*h*, and 125*i*, respectively, to the voter-comparator-selector unit. The gates form the output signals E, F, G, H, and I, based upon the signal from the R-matrix logic unit 112, when 3V or 2CO indicating three-way voting or two-way comparison between selected ones of the computer modules in accordance with the following Boolean logic equations:

E = [A·3V(ABC) ]+[A·3V(ABD) ]+[A·3V(ACD) ]+[B·3V(BCD) ]

F = [B·3V(ABC) ]+[B·3V(ABD) ]+[C·3V(ACD) ]+[C·3V(BCD) ]

G = [C· 3V(ABC) ]+[D·3V(ABD) ]+[D·3V(ACD) ]+[D·3V(BCD) ]

H = [A·2CO(AB) ]+[A·2CO(AC) ]+[A·2CO(AD) ]+[B·2CO(BC) ]+[B·2CO(BD) ]+[C·2CO(CD) ]

I = [B·2CO(AB) ]+[C·2CO(AC) ]+[D·2CO(AD) ]+[C·2CO(BC) ]+[D·2CO(BD) ]+[D·2CO(CD) ]

The output signals E, F, G, H, and I formed in the logic circuitry in compliance with the above equations are furnished over the conductors 125*e*, 125*f*, 125*g*, 125*h*, and 125*i*, respectively, to the voter-comparator-selector unit 140.

Voter-Comparator-Selector

The voter-comparator-selector unit 140 (FIG. 3 and FIGS. 8 through 8*c*) receives the signal A through I over the input conductors 125*a* through 125*i*, respectively, representing the data from computer modules A through D and the signals E through I formed in the manner previously set forth in the input switching unit.

Figure 8:
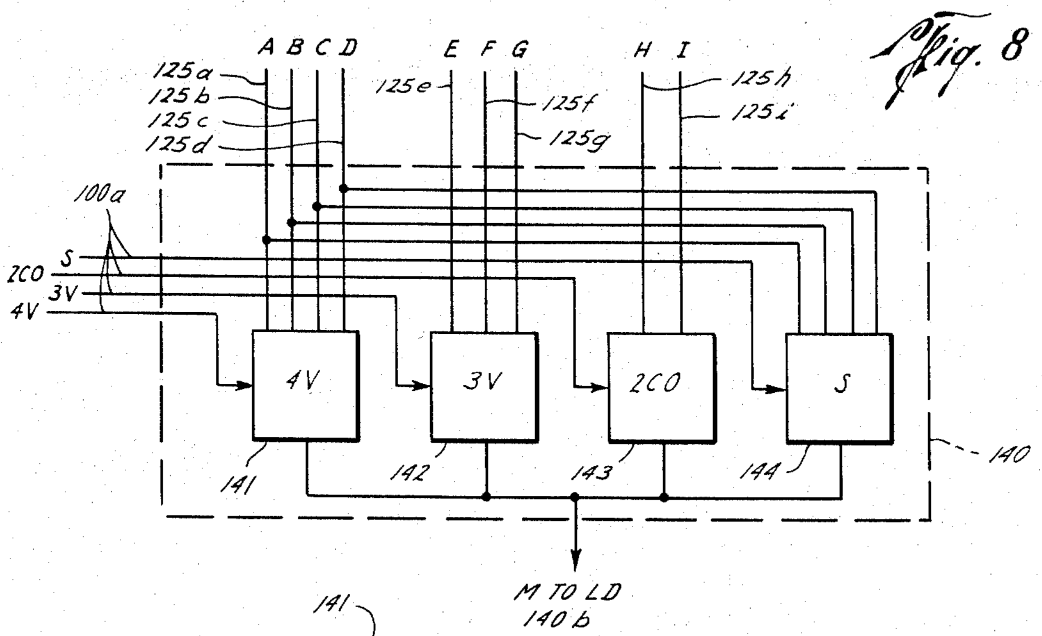
Figure 8A:
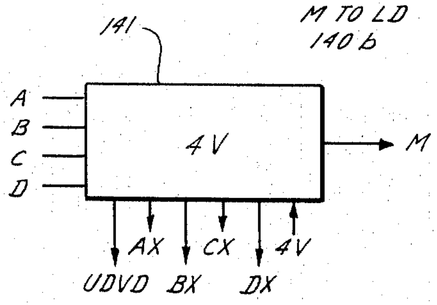
Figure 8B:
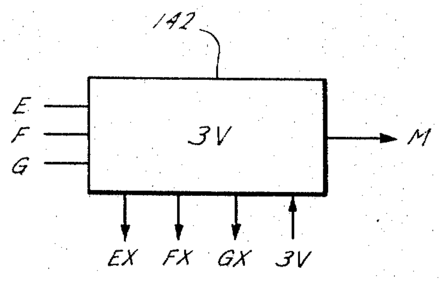
Figure 8C:
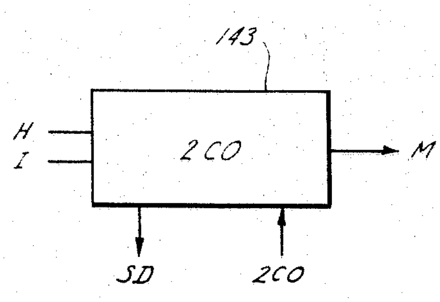
Figure 9:
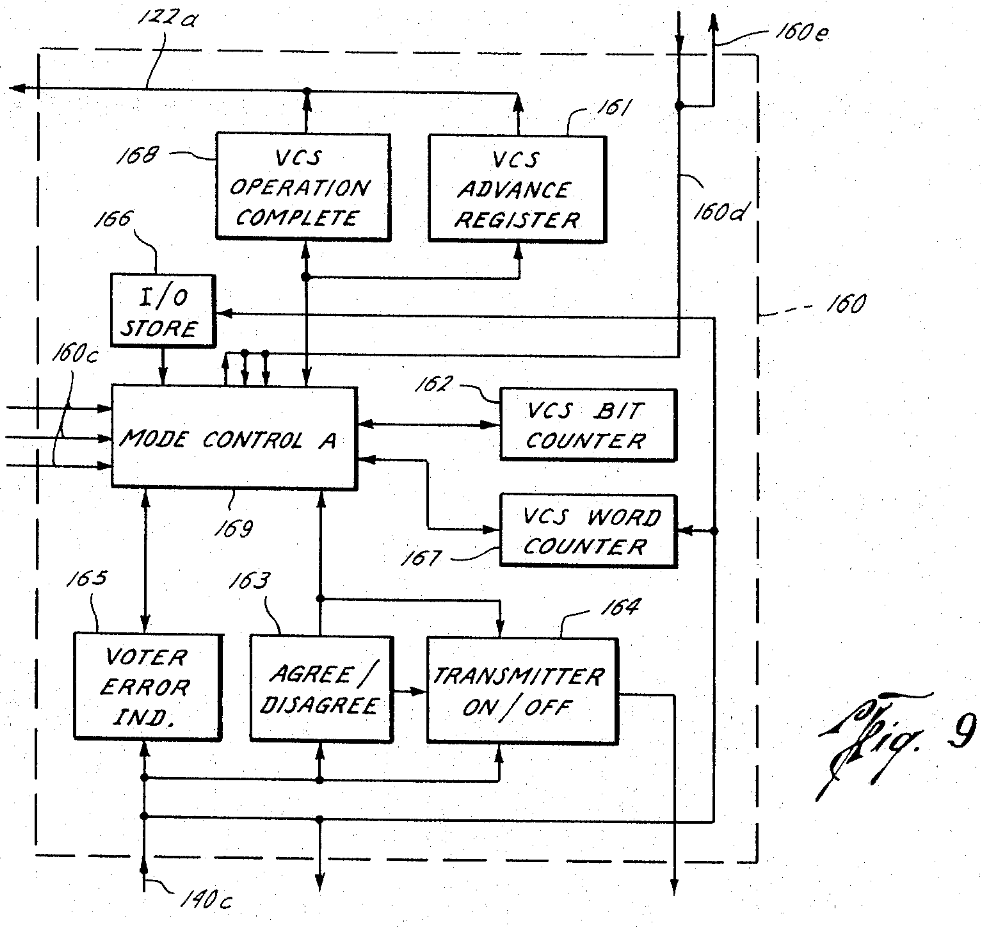

The voter-comparator-selector unit 140 further receives the signals 4V, 3V, 2CO and S(i) from the R-matrix logic unit 112 in the control unit 100 indicating the desired interconnection mode determined on the basis of adaptive majority logic within the control unit 100, as has been previously set forth. The voter-comparator-selector unit 140 responds to the desired interconnection signals from the control units 100 and connects the selected operational computer modules, the operational status thereof being determined in the manner previously st forth in the P-matrix logic unit 110, in the desired interconnection mode. A has been set forth, the interconnection mode is determined in the R-matrix logic unit 112 and furnished as an interconnection signal to the voter-comparator-selector unit 140. The voter-comparator-selector unit performs adaptive majority logic on the incoming data from the input switching unit 125 in one of four logic modules therein: a four-way voting module 141 (FIG. 8 and 8*a*), a three-way voting module (FIG. 8 and 8*b*), a two-way comparison module 143 (FIG. 8 and 8*c*) and a selector module 144 (FIG. 8). The logic modules 141 through 144 each form an output signal M in accordance with logic equations to be set forth hereinbelow and furnish such output signal to the line driver amplifier 140*b* in order that such output may be furnished over an I/O bus to external subsystems. Further, as will be set forth hereinbelow, thelogic modules, on the baiss of basis majority logic therein, furnish error status signals with respect to the input data to the voter-comparator-selector unit 140 to the S-matrix storage unit 116 in the control unit 100, as has been previously set forth.

Further, each of the logic modules has therein a buffer register of the type previously set forth in order that the individual bits in a data word being examined by the adaptive majority logic of the voter-comparator-selector unit in the logic modules 141 through 144 may be accomulated as the individual data bits and entire data word are examined therein. Such buffer registers are conventional, for example similar to those set forth in the buffer registers 121 hereinabove, and are not shown in the drawings to preserve clarity in the drawings.

The four-way voting logic module 141 (FIG. 8 and 8*a*) receives input signals over the input conductors 125*a* through 125*d* representing data from the computer modules A through D, respectively, and a four-way interconnection signal over the conductor 100*a* from the R-matrix logic unit 112 in the control unit 100. The four-way logic unit 141 forms an output signal M which represents the correct output data signal from the four computer modules A through D, which are designated A through D, respectively, for ease of understanding in the equations to be set forth hereinbelow.

Thus, should the data from one computer module differ from the data from the other three modules, for example computer module A, a data error signal AX formed in a manner to be set forth hereinbelow, is formed and transmitted to the S-matrix storage unit 116 in the control unit 100. Data error signals BX, CX, and DX, respectively, are error signals formed in a manner to be set forth hereinbelow indicating errors in the data from computer modules B, C, and D.

An undesirable voter discrepancy signal, designated UDVD, is formed in the four-way voting logic module 141 should the four-way voting logic module 141 be presented with input signals from two computer modules indicating that the data should be at one logic state, whereas the other two computer modules indicate that the opposite state for the input data is correct. Tus, in the eventof an equal vote in the four-way voting logic module 141, an undesirable voting discrepancy signal, UDVD, is formed and furnished to the S-matrix 116.

The four-way voting logic module 141 contains suitable gating circuitry, connected as taught by the Phister reference referred to hereinabove, to form output signals M, AX, BX, CX, DX, and UDVD in accordance with the following logic equations:

$M = (ABC+ACD+ABD+BCD)\cdot 4V$ $AX = (\bar{A}BCD+A\overline{BCD})\cdot 4V$ $BX = (A\bar{B}CD+\bar{A}B\overline{CD})\cdot 4V$ $CX = (AB\bar{C}D+\overline{AB}C\bar{D})\cdot 4V$ $DX = (ABC\bar{D}+\overline{ABC}D)\cdot 4V$ $UDVD = (\overline{AB}CD+\bar{A}B\bar{C}D+\bar{A}BC\bar{D}+A\overline{BC}D+A\bar{B}C\bar{D}+AB\overline{CD})\cdot 4V$ The three-way voting logic module 142 (FIGS. 8 and 8B), receives the input signals from the conductors 125*e* through 125*g* representing the signals E through G, respectively, formed in the input switching unit 125 and designating the three computer modules participating in the three-way voting. The three-way voting logic module 142 receives a 3V input signal over the conductor 100*a* from The R-matrix logic unit 112 indicating that three-way voting between three of the computer modules in the system is the desired interconnection mode. Te three-way voting logic module forms an output signal M and furnishes same to the line driver amplifier 140*b*. The output signal M from the three-way voting logic module 142 represents the majority decision, namely at least two of the three computer modules have this data output. Should one of the three computer modules have an output differing from the majority opinion, an error signal EX, FX, or GX, formed in a manner to be set forth hereinbelow, is formed and transmitted to the S-matrix storage unit 116 in the control unit 100. As was the case with the four-way voting logic module 141, the three-way voting logic module 142 requires receipt of a 3V input signal from the R-matrix logic unit 112 in the control unit 100 before three-way voting occurs.

Te following logic equations define the desired gating interconnections ofthe input signals E, F, G, and 3V to the three-way voting logic module 142 in order to form the desired output signal M:

$M = (EF+EG+FG)\cdot 3V$ $EX = (E\overline{FG}+\bar{E}FG)\cdot 3V$ $FX = (E\bar{F}G+\bar{E}F\bar{G})\cdot 3V$ $GX = (\overline{EF}G+EF\bar{G})\cdot 3V$ The two-input comparator logic module 143 receives the input signals H and I from the input conductors 125*h* and 125*i*, as well as the 2CO signal fromthe R-matrix logic unit 112 in the control unit 100, indicating that two-way comparison between a specific two of the computer modules is to be perfomed in the two-way comparison logic unit 143.

The two-way comparison logic unit 143 forms an output signal M indicating agreenment between the data output from the two computer modules whose output is being compared therein. Further, should the data output from the two computer modules being compared differ, a comparison error signal SD is formed and furnished to the S-matrix 116 in the control unit 100.

The following equations specify the desired interconnection of the gates and logic circuitry in the two-way comparison logic unit 143 in order to form the output signals M and SD:

$M = (HI)\cdot 2CO$ $SD = (H\bar{I}+\bar{H}I)\cdot 2CO$

The selector unit S(i) forms an output signal in response to the receipt of an input signal S(i) from the R-matrix logic unit 112 in the control unit 100, i designating the computer module A, B, C, or D to be selected in the voter-comparator-selector unit 140 by the selector logic module 144. An output signal M is formed in the logic unit 144 representing the desired output signal from such logic unit in accordance with the following logic equations:

$M = A\cdot S(A)+B\cdot S(B)+C\cdot S(C)+D\cdot S(D)$

Routing Logic Unit

The routing logic unit 160 (FIGS. 3 and 9) includes a mode control unit 169 controlling the operation of an VCS Advance Register Discrete or flip-flop 161, a VCS Bit Counter 162, and Agree/Disagree Indicator 163, a Transmitter On/Off Indicator 164, a Voter Error Indicator Unit 165, an I/O Store Unit 166, a VCS Word Counter 167, and a VCS Operation Complete Discrete or flip-flop 168. The control of the mode control unit 169 over such units will be more evident hereinbelow.

The mode control unit 169 receives input signals on the conductors 160*c* from the four buffer registers 121 (FIG. 4) and the VCS indicating receipt of data words, as has been previously set forth.

The mode control circuits further receive operational/failure status signals from the P-matrix storage unit 105 and the R-matrix storage unit 106 in the control unit 100 from the IOP over an input bus 160*d*. Further, the mode control unit 169 provides outgoing signals over the bus 160*e* through the IOP for transmission to the S-matrix storage unit and other computer modules in the computer system S. The VCS Operation Complete flip-flop 168 and the VCS Advance Register flip-flop 161 respond to signals from the mode control unit 169 and control the movement of data through the buffer registers 121 by means of signals over the data bus 122*a*, as has been previously set forth. The VCS Operation Complete flip-flop 168 sends a signal over the bus 122*a* upon completion of each voting operation in the Voter-Comparator-Selector unit 140 in response to receipt of a signal at the mode control unit 169, in a manner to be set forth hereinbelow.

The VCS Advance Register flip-flop 161 furnishes a signal over the bus 122*a* indicating to the buffer registers 121 that movement of the data through such buffer registers is to continue until receipt of the signal from the flip-flop 168.

The VCS Bit counter Unit 162 is a five-bit binary counter which is advanced a binary "1" count for each bit moved through the buffer registers 121. The mode control circuit 169 advances the bit counter 162 in response to signals from the buffer registers 121 indicating such a movement of bits through the buffer registers 121 and furnished to the mode control unit 169 over the conductors 160*c*.

The VCS word counter 167 receives a word count of the data words present in the buffer registers 121 which is furnished to the mode control unit 169 over the conductors 160*c*. The word count is transferred from the mode control unit 169 to the word counter 167 to count the number of data words which are to be compared by the voter-comparator-selector unit 140. The count in the six-bit VCS word counter 167 is decremented one count after each output word from the voter-comparator-selector buffer registers, previously set forth, by a signal over the conductor 140*c*. When the VCS word counter 167 reaches a binary zero count, the mode control unit 169 is notified in order that the VCS operation complete flip-flop 168 may be set to a state to indicate to the buffer registers 121 that input operations are complete.

The I/O store flip-flop 166 receives its signal from the buffer registers in the voter-comparator-selector unit 140 and indicates to the mode control unit 169 whether a subsequent input/output operation is desired when the VCS word counter 167 has reached a binary zero count.

The voter error indicator 165, the agree/disagree flip-flop 163 and the transmitter on/off indicator 164 receive input signals from the voter-comparator-selector unit 140 over the data bus 140*c* and indicate to the mode control unit 169 whether the voter has determined an error, whether the voter agrees or disagrees with the majority of computer modules taking part in the adaptive voting, and whether the transmitter and the buffer shift registers in the voter-comparator-selector 140 should be inhibited from transmitting erroneous data. The transmitter on/off flip-flop 164 is set to inhibit transmission of data by the buffer registers in the voter-comparator-selector unit 140 in response to an indication of disagreement by the agree/disagree flip-flop 163 as determined in the voter-comparator-selector unit. T8e voter error indicator flip-flops indicate to the mode control unit 169 the particular type of error found in the voter-comparator-selector unit during the adaptive voting performed therein.

The following chart represents the number of flip-flop bits required in each of the units and the routing logic unit 160:

ROUTING LOGIC UNIT (One Set Required Per VCS)

| UNIT | Flip-flop Bits |
|---|---|
| VCS Advance Registered Discrete 161 | 1 |
| VCS Bit Counter 162 | 5 |
| Agree/Disagree Indicator 163 | 1 |
| Transmitter On/Off Indicator 164 | 1 |
| Voter Error Indicators 165 | 5 |
| I/O Store 166 | 1 |
| VCS Word Counter 167 | 6 |
| VCS Operation Complete Discrete 168 | 1 |
| Mode Control 169 | 5 |

INPUT/OUTPUT PROCESSOR (IOP)

The input/output processor, hereinafter referred to for the purposes of brevity as the IOP, functions as an independent processor operating under a stored program in the memory of the computer module with which the apparatus P of the present invention is associated. The IOP is capable of interfacing with the internal memory of the computer module directly via a memory bus, as will be set forth hereinbelow. As has been previously set forth, the IOP is capable of three types of input/output functions, namely Type 1 for computer-to-computer communication; Type 2 for computer-to-external subsystem communication; and Type 3 for computer-to-parallel channel communication. When desired, conventional line receivers and transmitters, as well as conventional encoders and decoders as shown in the drawing may be used in each of the three channels.

The IOP is set into operation of the decoding of a command and/or a control word. The commands are stored in the computer memory and are accessed according to a command program counter, to be set forth hereinbelow, in the IOP. Control words are also stored in the memory and are also received from other computer modules in the computer system S over the Type 1 bus. Control words are executed only when specified by a command, or when a control word is received over the inter-computer Type 1 bus. The internal and external control words mechanize the complete set of the IOP information transfer operations. The IOP information transfer operations, as will be set forth hereinbelow, include data transfer between computers, data transfer between computers and external subsystems; and data transfer between computers and VCS'es.

As has been previously set forth, the Input/Output unit of a conventional general purpose digital data processing computer, when such computer has been properly programmed in accordance with the operations to be set forth in detail hereinbelow, may function as the IOP in the place of the IOP to be set forth hereinbelow.

IOP Commands and Control Words

Figure 10:
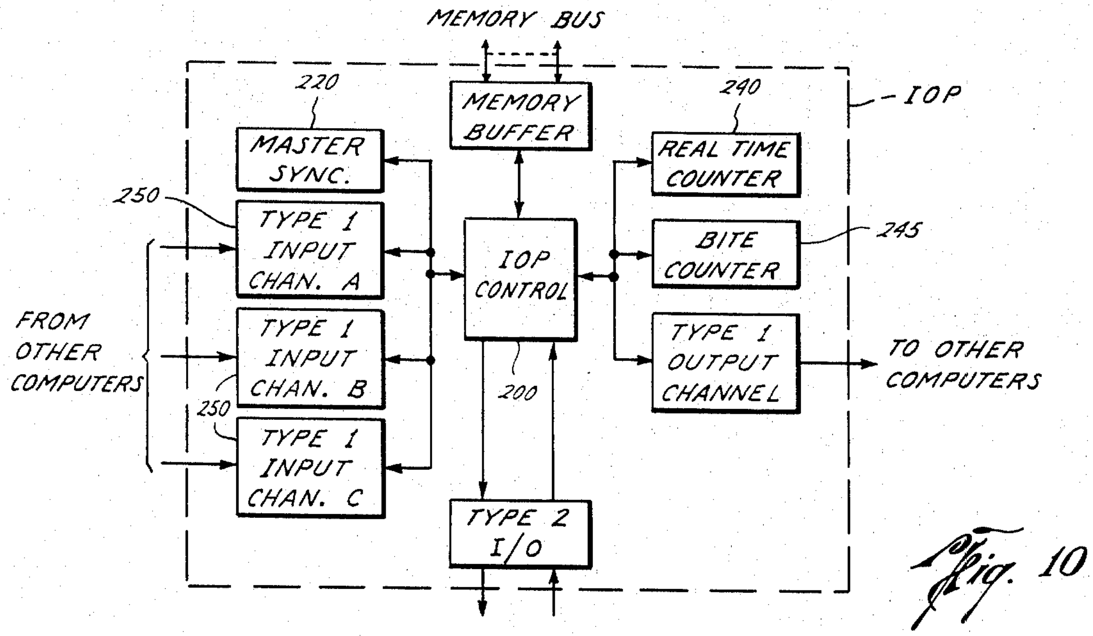
FIG. 10 is a schematic electrical circuit diagram of the input-output processor of the control apparatus of the present invention.
Figure 14:
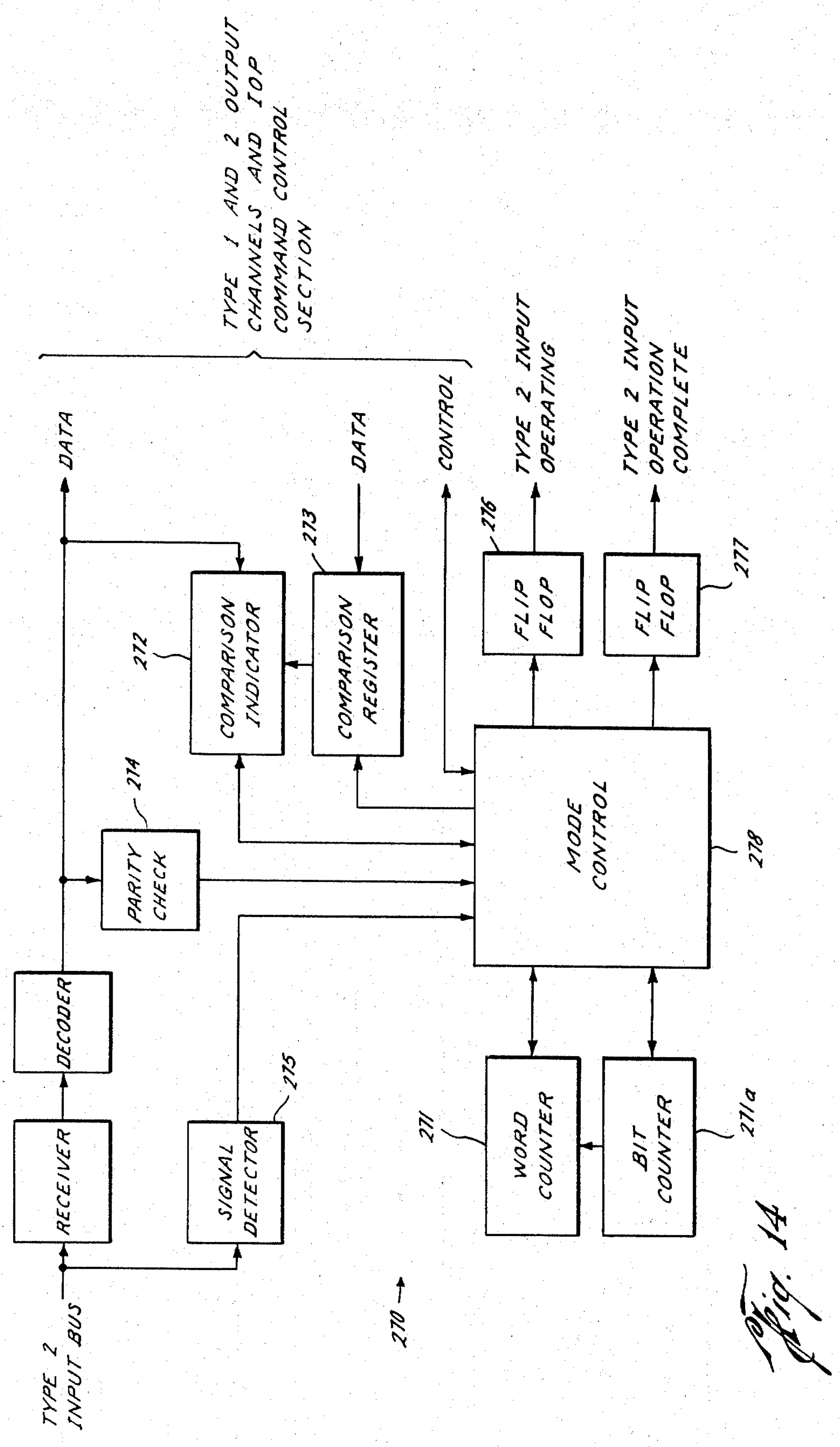
Figure 15:
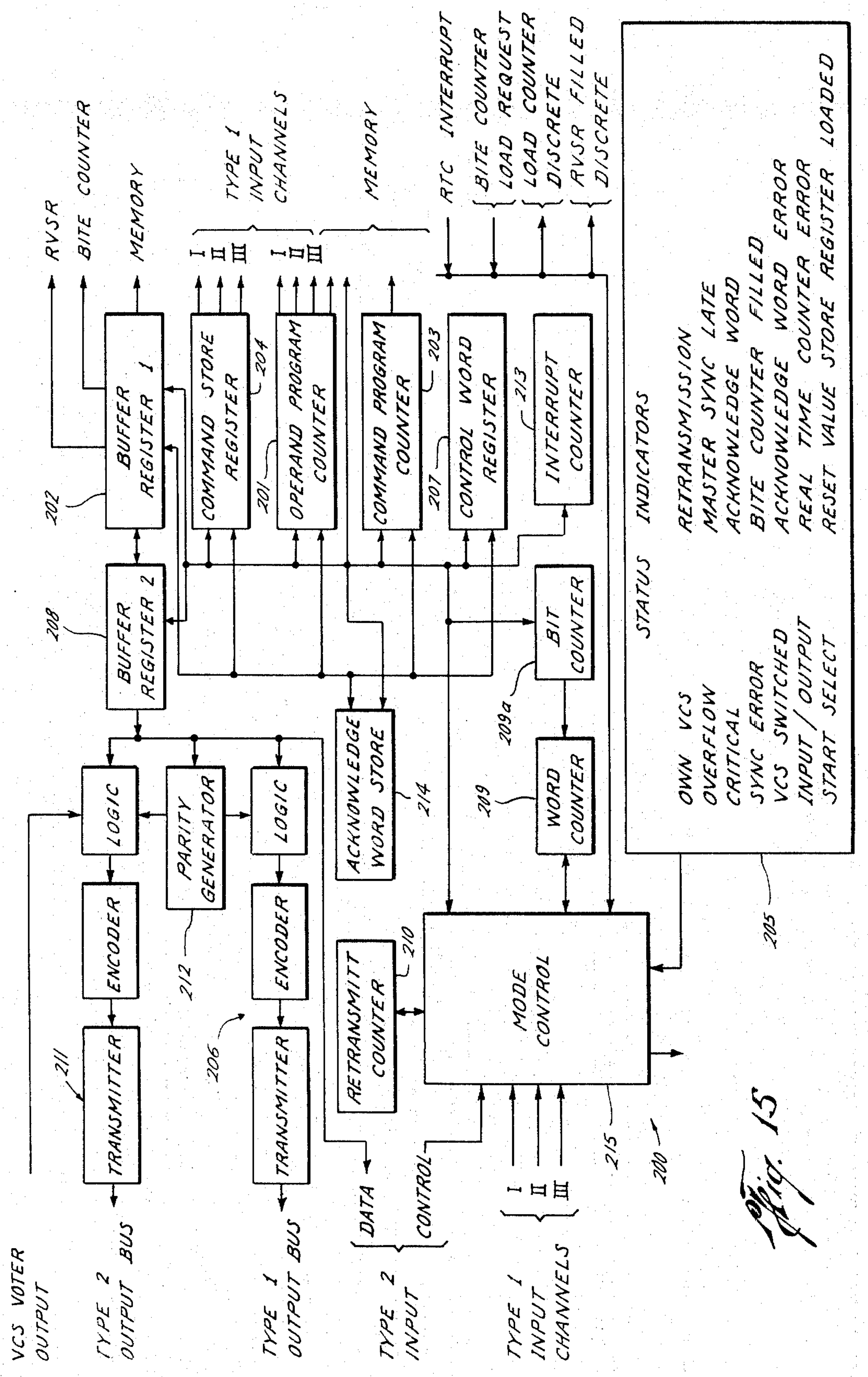

The IOP (FIGS. 10–15) is set into operation by the decoding of a command and/or a control word. The commands are stored in the memory of the computer module with which the IOP is associated, and are accessed according to a command program counter in an IOP Control Unit 200 of the IOP (FIG. 10 and 15). Control words are also stored in the computer module memory and are also received from other computer modules in the system over the Type 1 inter-computer bus. Commands are executed in sequence as any other conventional software computer program. Control words are executed only when specified by a command or when a control word is received over the Type 1 inter-computer bus.

The command and control word formats are given in Tables 1 and 2 respectively, set forth hereinbelow. Rference to these Tables will clarify the discussion of the commands and operations of the IOP.

TABLE I.—IOP COMMAND FORMATS

| Bit Position | 32 … 25 | 24 | 23 … 17 | 16 … 1 |
|---|---|---|---|---|
| | Operation Code | Flag | Spare | Master Sync Control Word Address |

Halt and Proceed

| Bit Position | 32 … 25 | 24 … 9 | 8 … 1 |
|---|---|---|---|
| | Operation Code | Address | Spare |

Jump

| Bit Position | 32 … 25 | 24 | 23 … 18 | 17 … 1 |
|---|---|---|---|---|
| | Operation Code | Flag | Counter Number | Spare |

Conditional Skip

| Bit Position | 32 … 25 | 24 | 23 … 8 | 7 … 1 |
|---|---|---|---|---|
| | Operation Code | Flag | Address | Spare |

Fetch Control Word

TABLE II.—CONTROL WORD FORMATS

| Bit position | 32 … 29 | 28 | 26 | 25 … 21 | 20 19 … 17 | 16 … 11 | 10 … 7 | 6 … 1 |
|---|---|---|---|---|---|---|---|---|
| | Computer Address | Type | Rexmit | L P Address | I/O Spare | Data Location | Reply Buses | Number of Words |

Computer to Local Processor Control Word

| Bit position | 32 … 29 | 28 27 | 26 … 21 | 20 | 19 … 17 | 16 … 13 | 12 … 7 | 6 … 1 |
|---|---|---|---|---|---|---|---|---|
| | Computer Address | Type | Memory Address | I/O | Spare | Return Address | Return Store Address | Number of Words |

Computer to Computer (Memory) Control Word

| Bit position | 32 … 29 | 28 27 | 26 … 23 | 22 … 19 | 18 … 17 | 16 … 13 | 12 … 7 | 6 … 1 |
|---|---|---|---|---|---|---|---|---|
| | Computer Address | Type | Operation Code | Data Address | Spare | Return Address | Return Store Address | Spare |

Computer to Computer (IOP) Control Word

| Bit position | 32 … 29 | 28 … 27 | 26 … 21 | 20 | 19 … 17 | 16 … 12 | 11 … 7 | 6 … 1 |
|---|---|---|---|---|---|---|---|---|
| | Reply Bus | Type | Data Location | I/O | Spare | L P Address | L P Status | Number of Words |

Acknowledge Control Word

Commands

The IOP is capable of performing the following commands:

a. Halt and Proceed
b. Jump
c. Conditional Skip
d. Fetch Control Word

The halt and proceed command (HPR) causes the IOP to enter an idle mode, in which no commands are executed. The IOP will respond to HPR control words received over the Type 1 inter-computer bus when in the idle mode. If the flag bit 24 is zero set, the IOP idles and does nothing during the idle mode. If the flag bit 24 is one set, the IOP performs a master sync operation, to be set forth hereinbelow, when the real time counter reaches a specified count. In either case, when the idle mode is entered, the command program counter is set to a fixed code for accessing the next command when the idle mode is terminated.

Figure 11:
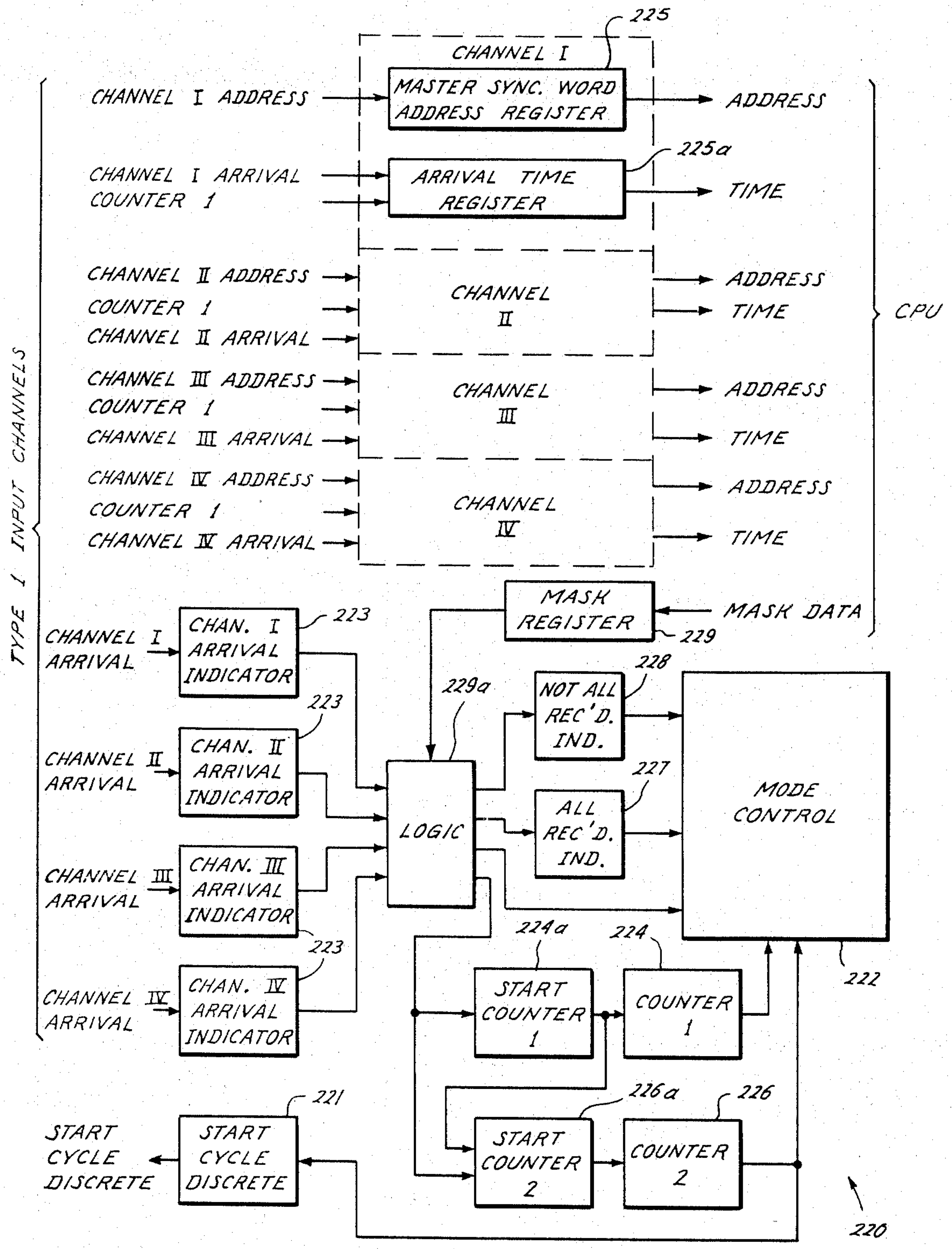
FIGS. 11, 12, 13, 14 and 15 are detailed schematic electrical circuit diagrams of subsystems of the input-output processor shown in FIG. 10.

The master sync operation is performed in a master sync unit 220 of the IOP, to be set forth hereinbelow, and includes sending a master sync control word to other computer modules in the system and a master sync mask code to the master sync unit 220. The master sync mask code is a four bit field contained in a master sync control word. The master sync control word is located in the computer module memory at the address specified by the sixteen least significant bits of the HPR command word. The master sync operation is performed based on the master sync control words as they are received by the IOP. A detailed description of this operation is given hereinbelow in description of the master sync unit 220 (FIG. 10 and FIG. 11).

The IOP remains in the idle mode until either a real time counter interrupt flip-flop 241 (FIG. 12) in a real time counter unit 240, or a start cycle discrete 221 in master sync unit 220 (FIG. 11) goes true. The real time counter interrupt 241 is used if the flag bit 24 in the HPR command is zero set and the cycle start discrete is used if the flag bit 24 is one set. The IOP then accesses the memory according to the command program counter for the next instruction.

The jump command causes the IOP to use the address field of this command as the memory location in the computer module of the next command to be accessed. The address field is placed in the command program counter and the memory accessed.

The conditional skip command causes the IPO to branch in the program being performed by the IOP depending upon certain conditions. Step-by-step operation of the command is as follows:

a. The counter number field is used as the least significant bits of a memory address. The address (Table I) is placed in the operand program counter 201 of IOP (FIG. 15) control 200.
b. The contents of that location are read into a buffer register 202 in the IOP control 200.
c. The 16 least significant bits of the buffer register are treated as a counter and incremented by one count — overflow is noted and stored.
d. If an overflow is detected:
   1. The 16 most significant bits of the buffer register 202 are copied into the 16 least significant bit positions thereto, thereby re-initializing the counter 201.
   2. The buffer register 202 contents are stored back in the memory location from which they were withdrawn.
   3. A command program counter 203 of the IOP is incremented one count.
e. If no overflow is detected, the flag bit 24 of the command is investigated.
f. If the flag bit is a zero:
   1. The contents of the buffer register 202 are placed back in the memory location from which they were withdrawn.
   2. The command program counter 203 is incremented two counts.
g. If the flag bit is a one, the command program counter 203 is incremented by two counts.

The fetch control word command causes the IOP to place the memory address field of the command in the operand program counter 201. This memory location is accessed and the contents read into a command storage register 204. This word is a control word and further operation of the IOP is then controlled by this control word. If the flag bit 24 is zero set, all input/output channels, Type 1, Type 2, and Type 3, of the IOP are allowed access to the computer memory. If the flag bit 24 is one set, the Type 3 input/output channel between the computer and the mass memory/data management system is locked out in order to preserve program synchronization during critical operating modes.

After the fetch control word command is executed, the command program counter is incremented by one count and the next command is accessed from the computer memory.

Control Words

All data going in or out of the computer is controlled by the IOP executing control words. To output data or data requests over the Types 1 and 2 channels and to input data over the Type 2 channel, the IOP operates according to control words accessed from the computer memory. To input data or data requests over the Type 1 channel, the IOP operates according to control words received from an external subsystem source. There are four control words:

a. Computer to local subsystem or processor control word
2. Computer to computer (memory) control word
3. Computer to computer (IOP) control word
4. Acknowledge control word The IOP is capable of receiving all four control word types from external devices, but can only originate the first three control words listed above.

The type of control word is specified by the type field (bits 27 and 28) of the control word as follows:

| Type | Bits 28 | 27 |
|---|---|---|
| Acknowledge | 0 | 0 |
| Computer to local processor | 0 | 1 |
| Computer to computer (memory) | 1 | 1 |
| Computer to computer (IOP) | 1 | 0 |

The computer to local processor control word (CLP) is used when data are to be sent to or requested from a local processor over an I/O bus 10, 20, 30, or 40. The fields of the control word are defined as follows:

| Field | Bits | Definition |
|---|---|---|
| *Computer Address | 4 | Indicates which computer modules are to receive the control word. Any combination of computer modules may be addressed by setting the appropriate bits to ONE. |
| Type | 2 | Identifies control word type. |
| Retransmit | 1 | ONE: Message is to be sent again if an error is detected in the transmission. ZERO: Message is to be sent once. |
| LP Address | 5 | Identifies the local processor being accessed by the computer modules. |
| I/O | 1 | ONE: Data are to be input to the computer module. ZERO: Data are to be output from the computer module |
| Data location | 6 | Identifies the address of the first data word of the message in the local processor memory. |
| *Reply Buses | 4 | Identifies the I/O busses over which data are to be transmitted from the local |

| | | |
|---|---|---|
| | | processor to the computer module. |
| Number of Words | 6 | Indicates the number of data words in the message. |

When the control word is initially accessed from memory, the fields marked by an asterisk in the above list are not the codes having the meaning given in the definition column. The initial value of these fields is a memory address containing the actual codes to be inserted in these fields in the control word. The IOP places such initial values in the least significant bit positions of the operand program counter 201, sets the upper bits to a fixed code and accesses the computer memory. The word so accessed from the memory contains the actual codes which are inserted into the buffer register 202 holding the control word, at which time the control word is ready to be transmitted.

The computer to computer (memory) control word (CCM) is used when data are to be sent between computer memories over the inter-computer bus. The fields of the control word are defined as follows:

| Field | Bits | Definition |
|---|---|---|
| Computer Address | 4 | Same as CLP |
| Type | 2 | Same as CLP |
| Memory Address | 6 | Identifies a location in the memory of the computer receiving the control word. |
| I/O | 1 | Same as CLP |
| Return Address | 4 | Identifies the computer sending the control word. |
| Return Store Address | 6 | Identifies a location in the memory of the computer sending the control word. |
| Number of Words | 6 | Same as CLP |

The computer to computer (IOP) control word (CCI) is used when the R, P and S matrices of the other computers are to be sampled or set, and when a master sync operation is to be performed. The fields of the control word are defined as follows:

| Field | Bits | Definition |
|---|---|---|
| Computer Address | 4 | Same as CLP |
| Type | 2 | Same as CLP |
| Operation Code | 4 | Identifies the operation to be performed by the receiving IOP. |
| Data Address | 4 | Identifies the location in the memory of the transmitting computer of the data to be used in setting the matrices. |
| Return Address | 4 | Same as CCM |
| Return Store Address | 6 | Same as CCM |

The data address field of the control word, when read from memory, forms the least significant bits of the location of the actual address to be used for accessing the data to be sent.

The operation field codes in the CCI control word are as follows:

Bits:

| 26 | 25 | 24 | 23 | Operation |
|---|---|---|---|---|
| 0 | 0 | 0 | 0 | Set R and P matrices to current value; Set S matrix to zero. |
| 0 | 0 | 0 | 1 | Set R matrix to current value. |
| 0 | 0 | 1 | 0 | Set P matrix to current value. |
| 0 | 0 | 1 | 1 | Set S matrix to zero. |
| 0 | 1 | 0 | 0 | Sample R, P and S matrices. |
| 0 | 1 | 0 | 1 | Sample R matrix. |
| 0 | 1 | 1 | 0 | Sample P matrix. |
| 0 | 1 | 1 | 1 | Sample S matrix. |
| 1 | 0 | 0 | 0 | Master Sync. |

The acknowledge control word is generated by the local subsystem or processors over the I/0 buses 10, 20, 30, and 40 and is sent to the computer module. The control word is sent to acknowledge the receipt of data from the IOP by the local processor or to start the transmission of data by the local processor to the IOP. The fields of the control word are defined as follows:

| Field | Bits | Definition |
|---|---|---|
| Reply Buses | 4 | Same as CLP |
| Type | 2 | Same as CLP |
| Data Location | 6 | Same as CLP |
| I/O | 1 | Same as CLP |
| LP Address | 5 | Same as CLP |
| LP Status | 5 | Identifies the operational status of the local processor and errors in data received by the local processor. |
| Number of Words | 6 | Same as CLP |

Master Sync Unit

The master sync unit 220 (FIG. 11) operation is started when the IOP executes the halt and proceed (HPR) command with the flag bit 24 set true. The master sync mode control unit 222 goes from the idle mode to a mode waiting for the arrival of the first master sync control word. The execution of the flagged command causes the IOP control 200 to idle until the real time counter 242 (FIG. 12) reaches a count of 72. At this time, the IOP accesses a dedicated memory location in the computer module for the master sync control word. This control word is sent to all computers over a type 1 output channel 206 of the IOP control 200 (FIG. 15). A start select flip-flop in status indicator unit 205 in the IOP control 200 is set so that the next IOP program cycle will be started when the cycle start discrete 221 of the master sync unit 220 goes true rather than when the real time counter interrupt 241 goes true.

The control word is received by a type 1 input channel 250 of the computer and bit positions 26, 27, and 28 of the word are investigated. If these bits form the binary code 101, the Type 1 input channel sets a channel arrival discrete 251 true. The control word is held in a channel buffer register 252 so that the master sync unit 220 can read the return address code in the control word.

The channel arrival discrete 251 sets a channel arrival flip-flop 223 in the master sync unit 220 for the channel A, B, C, or D sending the control word. At the next clock time, the state of a binary counter 224 (counter 1) is read into an arrival time register **225*a*. At the same time, bits 13 through 16 of a channel buffer register 252 are copied into the master sync word address register 225. The Type 1 input channel is then released and available for other uses. The matter sync unit 220 has one master sync word address register 225 for each Type 1 input channel. The above procedure is repeated for each master sync control word received by the IOP before the master sync unit 220** completes the master sync operation.

Figure 12:
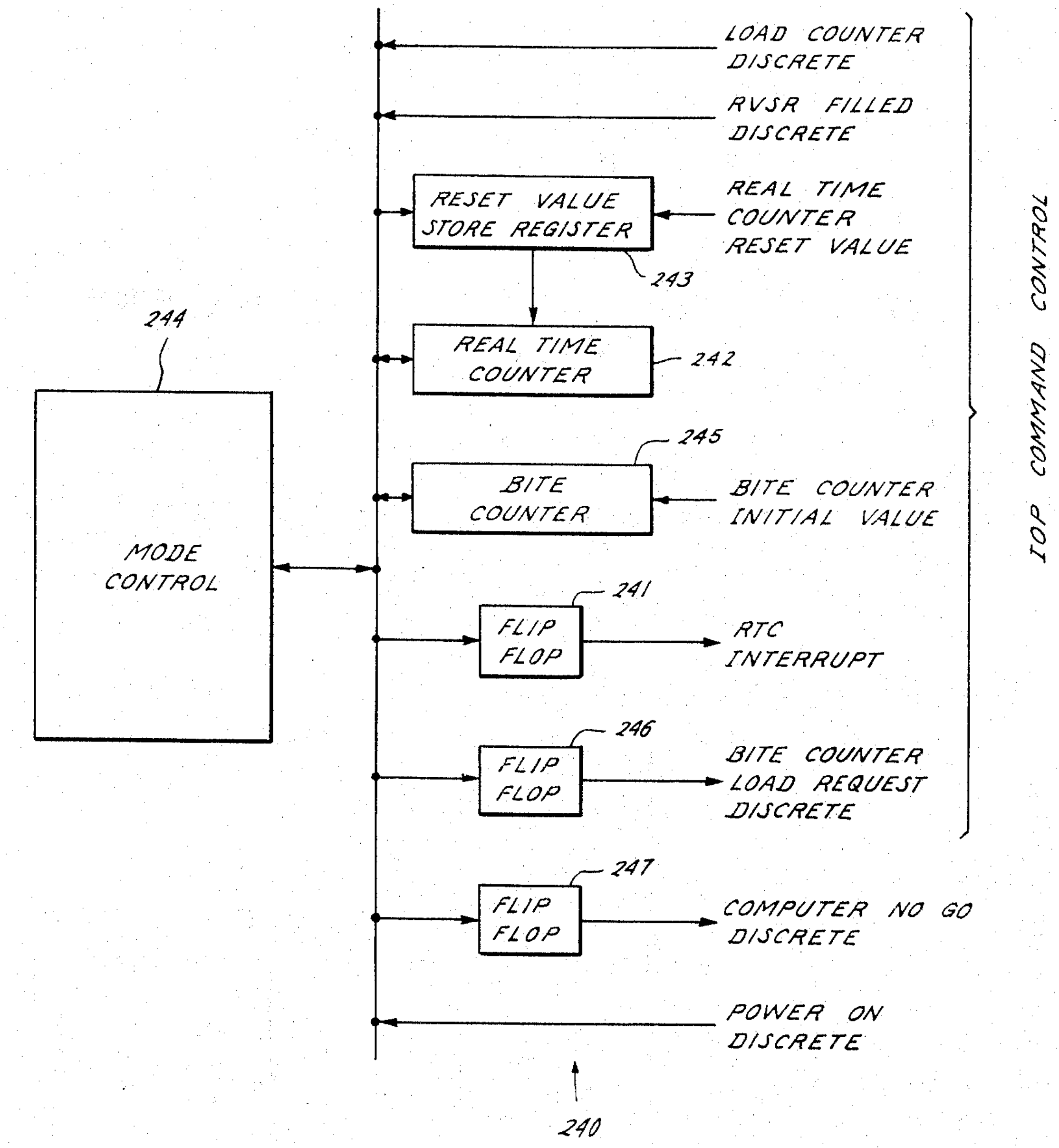

The first master sync control word that arrives causes a start counter 1 flip-flop **224*a* to be set. This indicates that one control word has arrived and starts the timing by counter 224 of the intervals between the various control word arrivals. Counter 224 provides this timing by counting at a predetermined logic clock rate. The start counter 1 flip-flop 224*a*, being set, enables the next channel arrival discrete 223 to receive a signal to set a start counter 2 flip-flop 226*a*. At this time, binary counter 226 also beging counting at the predetermined logic clock rate. Counter 226 overflows after eight counts, setting the start cycle flip-flop 221. One clock time later, the start cycle flip-flop 221 is reset. The output of the start cycle flip-flop 221 appears as a discrete that goes true for one clock pulse that is used to initialize and start the real time counter 240 (FIG. 12**).

Periodically during system operation, the IOP programs of the computers are synchronized by the CPU program to have proper synchronized operation.

The master sync operation is started when the IOP control 200 executes the halt and proceed command upon receipt thereof with the flag bit 24 set true. The master sync unit mode control 222 thereupon goes from the idle mode to a waiting mode pending arrival of the first master sync control word. The execution of the flagged command causes the IOP control 200 to idle until the real time counter 242 reaches a predetermined count. At this point, the IOP accesses a dedicated memory location for the master sync control word. This control word is sent to all computers over the Type 1 output channel 206 (FIG. 15).

The control word is received by the Type 1 input channel 250 of the computer and bit positions 26, 27, and 28 are investigated. If these bits form the binary code 101, the Type 1 input channel sets its channel arrival discrete 223 true. The control word is held in the channel buffer register 201 so that the master sync unit 220 can read the return address code.

In the master sync unit 220, the channel arrival discrete 223 sets a channel arrival flip-flop. At the next clock time the state of the binary counter 224 is read into the arrival time register 225*a*. At the same time, bits 13 through 16 of the channel buffer register 201 are copied into the master sync word address register 225. The Type 1 input channel is released for other uses. As previously set forth, the master sync unit 220 has one set of registers 225 for each Type 1 input channel. The above procedure is repeated for each master sync control word received by the computer before the master sync unit 220 completes the master sync operation.

The operation of master sync unit 220 is based upon the fact that the real time counter 240 of the computer will be set to an initial value a predetermined time after the second master sync control word arrives at the computer.

The first master sync control word that arrives causes the start counter 1 flip-flop 224*a* to be set. This stores the fact that one control word has arrived and starts the timing of the intervals between the various control word arrivals. Counter 224 provides this timing by countinkg at the predetermined logic clock rate. The start counter 1 flip-flop 224*a* being set enables the next channel arrival discrete 223 to receive a control word to set the start counter 2 flip-flop 226*a*. Counter 226 also begins counting at logic clock rate at this time and overflows after eight counts, setting the start cycle flip-flop 221. One clock time later the cycle start flip-flop 221 is reset. the output of the cycle start flip-flop appears as a discrete that goes true for clock interval that is used to initialize and start the real time counter 240.

As a fault isolation aid, the relative times of arrival for the four master sync words are stored along with the addresses of the computers originating them. This information will be held in the registers for each channel until the next master sync operation when it will be replaced by the new data.

Further fault isolation aid is given by the states of the all-received flip-flop 227 and not-all-received flip-flop 228. These indicators tell whether or not the correct number of control words were received during the time after the arrival of the second control word. A mask register 229 is provided to indicate a malfunctioned computer module to control a logic unit 229*a* in order to mask out data from a computer module that has malfunctioned in order to eliminate faulty master sync operations.

The master sync control unit 220 detects a failed computer that has drifted too far out of sync and also continues operating correctly if a computer has drifted out of tolerance, but cannot be isolated. This situation can happen, e.g., if the tolerance is $\Delta t$, then as long as all sync words arrive within $\Delta t$, everything is functioning properly. However, if the words arrive within 2 $\Delta t$, it can be deduced that a failure has occurred, but unless one computer is more than $\Delta t$ out of sync with each of the other computers, the failure cannot be isolated. This difficulty in failure isolation results since no absolute timing reference is available. To prevent using a failed computer as the synchronizing source, the synchronization occurs on the basis of the second received master sync word, as previously set forth.

Real Time Counter

The rear time counter 240 (FIG. 10 and FIG. 12) is a programmable counter of predetermined bit size and defines a reference time period for the counter by counting down to zero at a fixed rate from a known value. The known value is provided by a computer counter constant stored in a dedicated memory location in the computer memory to enable recovery from a power transient.

When the computer is initially activated or recovers from a power transient, the IOP control 200 reads the contents of the dedicated memory location from the computer memory into a reset value store register 243. When the reset value storage register 243 is loaded, the contents are automatically read into the real time counter 242. The counter 242 is now decremented at clock rate by a programmable counter upon receipt of clock pulses from the computer basic logic or master clock. Upon reaching a zero count, the counter 242 issues a discrete pulse signal to the IOP, and the CPU central process of the computer. The contents of the reset value storage register 243 are read into the counter 242 and the operation repeated.

To maintain synchronism between the computers in the complex, periodically the individual real time counters 242 must be reset according to a master signal. This operation is the master sync operation previously set forth. When the master sync operation is performed, the real time counter 242 is filled with the contents of the storage register 243 and the timing started at that point.

Built-In Test Equipment (BITE) Counter

The BITE counter 245 is used to detect faults in either the computer hardware or software during operation. The counter 245 is set to a set value and counted down to zero at the computer clock rate. The BITE counter is a programmable counter of predetermined bite size and is decremented from the basic computer logic clock rate. The counter constant set value is determined by the contents of a dedicated location in the computer memory. If the counter reaches zero, an interrupt signal is issued by a flip-flop 247 indicating that the computer has malfunctioned. The counter is prevented from reaching zero by having the IOP and the CPU program work together in a manner to be set forth hereinbelow to reset the counter before it reaches zero.

The BITE counter 245 is initially loaded and started after application of power to a mode control unit 244 by the IOP control 200, accessing the computer memory and transferring the contents of the dedicated location into the BITE counter 245. The counter is counted down until it reaches a predetermined programmed load request count. At this point, the BITE counter load request discrete flip-flop 246 is set true. After completing the execution of every command, the IOP control 200 samples the BITE counter load request discrete flip-flop 246. If the discrete is false, the IOP control 200 continues on to the next command. If the discrete is true, the IOP control 200 accesses the dedicated memory location for the constant and loads the contents of the location accessed into buffer register 202.

Each time the IOP control 200 reads the dedicated memory location, zeroes are written into the location. This causes the CPU software program to write counter constant set value into the dedicated location before the next counter load request is made thereby resetting the BITE counter 245 correctly. A load counter discrete in mode control 206 of the IOP control 200 is set true causing the contents of buffer register 202 to be read into the BITE counter 245. The BITE counter load request discrete 246 is set false. The counter 245 is now reset and the operation repeats.

IOP Bus and Data Transfer Operations

The IOP transfers data commands over Type 1 channels for computer-to-computer communications, Type 2 channels for computer-to-external subsystem communications, and Type 3 channels for computer-to-mass memory storage system communications. The Type 3 channel function is conventional and of the well-known type and thus is not set forth in detail herein.

The operations over the Type 1 and Type 2 channels or data buses involve one or both of these buses with the input and output channels of each used in various combinations. The possible operation modes are:

a. Output data to local external subsystem processor with voting using internal VCS.
b. Output data to local external subsystem processor with voting using external VCS.
c. Output data to local external subsystem processor without voting.
d. Input data from local external subsystem processor with voting using internal VCS.
e. Input data from local external subsystem processor with voting using external VCS.
f. Input data from local external subsystem processor without voting.
g. Request data from another computer module.
h. Input data from another computer module.
i. Output requested data to another computer module.
j. Output data to another computer module.
k. Set matrices in another computer module.
l. Set own matrices according to data from another computer module.
m. Sample matrices in another computer module.
n. Sample own matrices on request of another computer module and transmit the data to the other computer module.
o. Master sync operation (set forth hereinbelow).

Reference to FIGS. 10-15 and the command and control words previously set forth is made to assist in the following description of the IOP Bus and Data Transfer Operations.

OUTPUT DATA TO EXTERNAL SUBSYSTEM

Outputting data to a local processor on external subsystems in the three ways set forth varies only in whether voting by the VCS is performed and in which VCS such voting takes place. The settings of the P and R matrices determine which way the data are handled, as has been previously set forth.

An output data operation begins with the execution of the fetch control word command, obtaining the control word from memory, and storing same in a control word store register 207 in the IOP control 200. The next sequential location in the computer memory after the one that holds the control word contains the memory address of the first data word of the message. This data word address is read into the buffer register 208 of the IOP control 200 for subsequent use.

Bits 20, 27, and 28 of the control word register 207 are investigated and, if set to a binary code of 010, indicate an output data to external subsystem operation. Bits 29 through 32 are of the control word register 207 are transferred into the least significant bit positions of the operand program counter 201 to form a memory address. This memory location is read into buffer register 202. This word contains 3 four bit fields:

a. Primary computer address
b. Secondary computer address
c. Reply buses code

Depending upon the setting of the VCS switched indicator in status indicator unit 205 of the IOP control 200, either the primary or secondary computer address fields are read from buffer register 202 into bit positions 29 through 32 of the control word register 207. The reply buses code field is read into bit positions 7 through 10 of the control word register 207.

The control word is now complete and ready to be transmitted. The contents of buffer register 208 are read into the operand program counter 207 in preparation for getting the data words from memory. The number of words field (bits 1 through 6) of the control word register 207 are read into a word counter 209 associated with the Type 1 output channel and the Type 2 output channel in IOP control 200 and a word counter 271 in the Type 2 input channel 270 (FIG. 14). The control word is read from the control word register 207 into buffer register 208 in preparation for sending.

Voting using the internal VCS involves the Type 2 input channel 270 and the Type 2 output channel in IOP control 200, the VCS, and Type 1 output channel in IOP control 200, one to three Type 1 input channels 250, in accordance with the desired interconnection mode, and the IOP control 200.

The control word in buffer register 208 is transferred in bit serial fashion into a VCS buffer register 121. The data from the other computer modules involved in the voting arrives over a Type 1 input channel 250. Such data is transferred into other VCS buffer registers 121. The registers 121 are used to remove small time differences in the arrival times of the data as has been set forth. All data are fed to the voter-comparator-selector 140, whose output is read into a buffer register contained therein. The contents of this register are valid only if a majority of inptus to the voter have agreed for the full word on a bit by bit comparison basis. This majority approved data are then transmitted to the external subsystem over the Type 2 output bus 10, 20, 30, or 40 in accordance with the VCS performing the voting.

Figure 13:
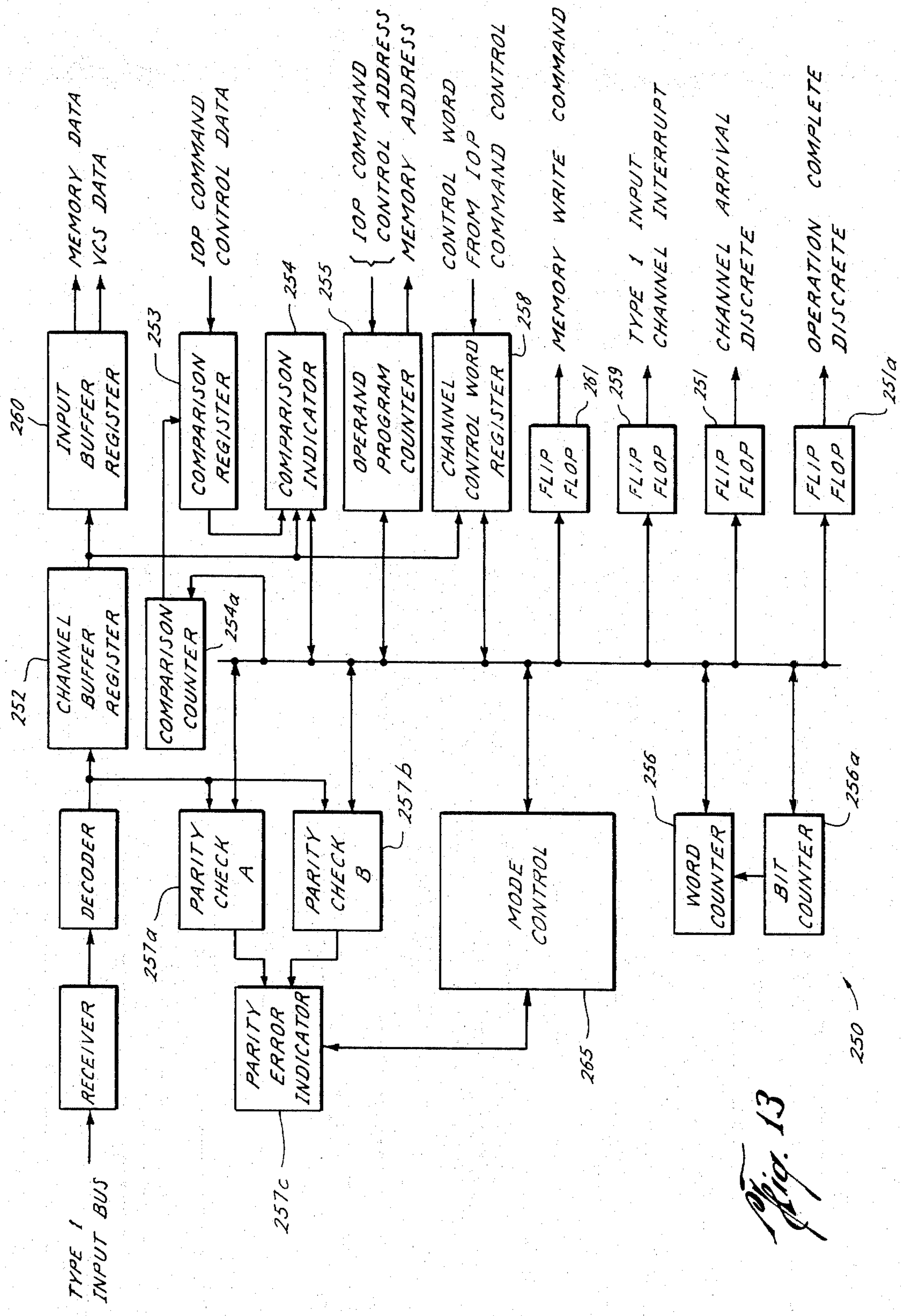

As the voted output data are shifted to the buffer register in the voter-comparator-selector 140, the data are also placed in a comparison register 253 in the Type 1 input channel 250 (FIG. 13). The data are held temporarily therein for a check against the data that are being received at the external subsystem. As the external subsystem receives the data, the same data returns to the computer on the Type 2 input channels 270. The IOP receives the data, ships the data out on the Type 1 output channel in IOP control 200 and compares the data with that in the comparison register 252. Discrepancies found during the comparison are stored in a comparison indicator 272 of the Type 2 input channel 270. This comparison continues until the last data word has been compared.

The external subsystem can use the received data only if a Go code is sent as the last word of the data message. The sending of this Go code is determined by the involved voting computers and the results of their comparison of the data received back from the external subsystem and the data sent to the VCS from the IOP. Each computer in the voting operation stores a Go or No-Go code based upon its comparison in comparison indicator 271 and sends that code to the VCS. The code adaptively voted by the VCS to be in the majority is sent to the external subsystem.

The code sent to the external subsystem is fed back to each computer module. Indicators are set to indicate whether the IOP with the computer module differed with the majority or not, and which code was received by the external subsystem. The IOP waits for the arrival of the acknowledge control word from the external subsystem. A status word is formed in the IOP based upon the acknowledge control word, the Go or No-Go code sent and received, and all other indicators formed during the message transmission. The status word is stored in memory in the location following the last data word.

With the status word stored away, the IOP checks the re-transmit flag (bit 26) of the control word register 207. If the flag is a binary zero, the operation is considered completed and the IOP command control goes on to the next operation in the program stored in the computer module memory. If the flag is a binary one and a No-Go code was received over the Type 2 input channel, the IOP command control increments a re-transmit counter 210. The next operation depends upon the count of the re-transmit counter 210 and the status of VCS switched indicator in status indicator unit 205.

If the count in counter 210 is less than three, the IOP control 200 ignores the VCS switched indicator in Unit 205 and executes the command held in the control word register 207. This is the same command that started the operation and thus the operation is repeated.

If the count in counter 210 is three, and the VCS switched indicator in indicator unit 205 is zero set, three attempts have been made using the same VCS to send the data to the external subsystem. The VCS switched indicator in unit 205 is then one set to indicate such status to the program stored in computer memory so that the next attempt to output data to an external subsystem is to be made using the secondary VCS assigned by the program. The IOP control 200 then returns to repeat the operation.

If the count in counter 210 is three and the VCS switched indicator in unit 205 is one set, such indicates three attempts have been made to get the data to the external subsystem using the primary VCS assigned by the program, and three attempts using the secondary VCS assigned by the program, with no successful attempts. This fault indication is indicated in the status word stored away at the end of the most recent operation attempting output. The IOP control 200 goes on to the next operation in the program, which might, for example, be a re-configuration program, altering the interconnection made of the computer modules and attempting failure analysis based on the fault indication.

Voting involving three computers gives a majority result if the VCS is operating correctly. However, in voting with two or four computers, there are cases where majorities may not exist. This is detected by the voter-comparator-selector 140 and causes a transmitter 211 for the Type 2 output channel to be turned off. The external subsystem responds to a loss of signal by resetting to the idle mode terminating the communication. This termination results in the loss of signal on the Type 2 input channel 270 and a consequent loss of signal on the Type 1 output channel 206. All computers respond to this loss of signal by terminating the output operation and generating a status word and retransmission is attempted in the manner previously set forth.

Voting using an external VCS involves the use of the Type 1 input channel 250 associated with the computer doing the voting, the Type 1 output channel 206 and the IOP control 200.

The control word held in buffer register 208 is sent serially into the Type 1 input channel comparison register 253 and is sent out over the Type 1 output channel 204. As the control word is being shifted out of buffer register 208, the IOP control 200 accesses the computer memory and reads the first data words into buffer register 202. When the last bit of the control word is shifted out of buffer register 208, the contents of buffer register 202 are read into buffer register 208. The shifting of the contents of buffer register 208 continues as was described for the control word. The word counter 209 is decremented for each 16 bits of data sent out. Until the word counter 209 reaches zero, the IOP accesses data words from memory.

The voting computer sends the voted output data returned via the Type 2 input 270 to the IOP over the Type 1 input channel 250. The returned data is compared with the data in the comparison register 252 and a Go or No-Go generated in a comparison indicator 254 and sent. The results of the comparison are stored temporarily for inclusion in the status word.

After receiving the acknowledge control word from the local subsystem, the IOP generates the status word and decides upon retransmission as previously described.

After completion of the operation, either successfully or unsuccessfully, the IOP control 200 goes on to the next operation in the program stored in the computer memory.

Output of data with no voting makes use of the Type 2 input channel 270 and Type 2 output channel 211, furnishing data for example to I/O bus 10, and the IOP control 200.

The IOP communicates directly with the external subsystem with the other computers and VCS'es performing unrelated functions or idling. The control word in buffer register 208 is sent out over the Type 2 output channel 211. As the control word is transmitted, the first data words are accessed from the computer module memory into the buffer register 202. The transmission of the data words is performed in a like manner to transmission of data words when voting using or external VCS.

When the last data word is transmitted, a Go/No-Go Code word is automatically sent out. The local processor sends back an acknowledge control word as before over the Type 2 input channel. A status word is formed and stored in memory. The IOP control 200 goes on to the next operation in the program. No re-transmission of the data messages is made in this mode.

Input Data from External Subsystem

As in the output data modes, a control word is accessed from memory by IOP control 200. In this case, bits 20, 27, and 28 form the code 110. The control word is formed as described above when outputting data to an external subsystem.

Each computer module has a Type 2 I/O data bus to the external subsystem that is independent of the other computer I/O buses, permitting multiple paths for transferring data from the external subsystem to the computer system S. Before any data are used, each computer compares the data received over its own I/O bus with the data received over other computer data I/O buses. The data are used according to the results of this comparison. So that all computers may have copies of the data received by the other buses, each computer will automatically send out on the Type 1 output channel 206 any data received over the Type 2 input channel 270.

Proper storage of these data sets requires that an operand program 255 counters of the Type 1 input channels 250 to preset to the proper addresses. After forming the control word, the IOP control 200 increments the operand program counter 255 by one. The count now defines a memory location holding the address for storage of the data message received by another computer. The succeeding memory locations are other addresses for the storage of other data messages. Up to four addresses are stored depending upon the number of data message duplicates desired by the program.

The IOP control 200 examines bits 7 through 10 of the control word register 207. These bits are the reply buses field. Each bit position corresponds to one computer in the system. A binary one in the bit position of the field means that a data message will be received by that computer represented by the bit position. The IOP control 200 scans the field starting at bit 7. If this position is a one, the computer memory is accessed, the contents thereof are read into the appropriate Type 1 input channel operand program counter 255 and the IOP control operand program counter 201 incremented by one. If the bit in the field is a zero, the IOP control 200 goes to the next bit position in the field in register 207. The operation is repeated until all four bit positions in the field have been checked and the Type 1 input channels set up for the operation.

Voting using internal VCS makes use of the Type 2 I/O input and output channels, the Type 1 output channel 204, the voter-comparator-selector 140, the IOP control 200 and one to three Type 1 input channels 250.

After the control word is formed, it is sent to the VCS buffer registers 121 and a comparison register 273 of the Type 2 input channel 270. The other control words are received by the Type 1 input channels 250 and transferred to the VCS. The control words are voted upon in the manner set forth and the majority results sent out to the external subsystem over the Type 2 I/O output channel. The results of the voting are stored in status indicator unit 205. The control word is received back over the Type 2 input channel 270 and compared with the contents of the comparison register 273. The control word is also sent out over the Type 1 output channel 209. The results of the comparison are stored in comparison indicator 272.

The IOP monitors the Type 2 input channel 270 for the acknowledge control word. When it arrives, it is checked for proper parity in a parity check unit 274 and the LP address and data locations fields in the acknowledge are compared with the similar fields stored in the control word register 207. The results of the comparison are stored in status indicator unit 205.

As data are received over the Type 2 input channel 270, the data are stored in computer memory and sent out over the Type 1 output channel 206. At the same time, data are received from the other computers over the Type 1 input channels 250 and stored in the computer memory. The end of the message is signified by the reading of a count of zero by a word counter 256 and 271 in the Type 1 and 2 input channels 250 and 270 respectively. At this point, all status indicators in unit 205 are used to form a status word to be stored in memory.

The decision as to whether the operation has been successful or not is based upon the results of the control word comparison (feedback version against original), failure to find a majority during voting, and the results of comparing the two fields of the acknowledge control word and the control word register 257. Disagreement in the comparisons or failure to find a majority results in a rerun of the operation of the retransmit flag bit 21 is set. The rerun is made in the manner previously set forth. Parity errors detected by parity check units 257*a* and 257*b* of the Type 1 input channels and stored in a parity error indicator 257*c* do not cause a retransmision try.

Voting using an external VCS makes use of the IOP control 200, the Type 2 input channel 270, the Type 1 output channel 204 and to three Type 1 input channels 250.

The control word, after being formed, is transmitted over the Type 1 output channel 204 amd placed in the comparison register 253 of the Type 1 input channel associated with the computer during the voting. The remainder of the operation proceeds in a like manner to voting using an internal VSC.

Input from a local processor with no voting makes use of the IOP command control 200 and the Type 2 I/O input and output channels.

The control word, after being formed, is sent out over the Type 2 I/O output channel directly to the external subsystem. The acknowledge control word from the external subsystem is received over the Type 2 input channel and checked in the manner previously set forth. The data are received and stored in the computer memory. A status word is formed at the end of the meassage and stored in memory. The operation is not repeated even should there be errors detected in the message.

Request data from another computer operation makes use of the IOP control 200 and the Type 1 output channel 204.

The control word for this operation is the computer-to-computer memory (CCM) type as identified by the binary code of 111 in bit positions 20, 27, and 28. This control work is made up by filling the computer address, memory address and return store address fields with data accessed from the computer memory by using the initial value of the computer address field as an address. The control word has the address of the requesting computer in the return address field. The control word is sent out on the Type 1 output channel 204. The IOP control 200 goes on to the next operation as the response to this request will be handled automatically by the Type 1 input channels.

Input data from another computer operation makes use of one Type 1 input channel 250.

This operation requires no stored commands or any action by the IOP control 200. All information necessary is found in the received control word. The control word holds the binary code of 111 in bit positions 20, 27, and 28. The control word is copied into a channel control word register 258 if party checks in parity check 257*a* and 257*b* on both halves of the control word are correct. As the first data word is received serially into the channel buffer register 257, the Type 1 input channel is set up as follows:

a. The number of words filled (bits 1 through 6) of the control word register are copied into the word counter 256.

b. The return store address field (bits 7 through 12) of the control word register are copied into the least significant bit positions of the operand program counter 255, limiting the area of memory that can be stored into directly by the external computer.

An error parity check on either half of the control word causes the Type 1 input channel to ignore the rest of the inputs on the bus.

Each data word received on the data bus is checked for parity. The word counter 256 is decremented one count for every 17 bits received on the bus. The parity bits are discarded and the data bits assembled into 32 bit words and stored in computer memory. When the word counter 256 reaches zero, a status word is formed and stored in computer memory after the last data word. The Type 1 input channel 250 goes to the idle mode ready for the next operation.

Output data to another computer output operates in one of two ways: one way is to fetch a control word from memory and the other way is to receive a control word requesting data over the Type 1 input channel 250.

Output of requested data to another computer makes use of the IOP control 200, the Type 1 output channel 206, and one Type 1 input channel 250.

The operation starts when the Type 1 input channel 250 receives a control word containing the binary code 011 in bit positions 20, 27, and 28. The input channel 250 places the control word in its control word register 258 and sets a Type 1 input channel interrupt 259 true.

The IOP control 200 examines the Type 1 input channel interrupts 259 after the completion of each operation. If one such channel interrupts is found to be true, the IOP control 200 reads from the control word register 258 of that Type 1 input channel into buffer register 208 the following information:

a. Bits 1 through 6 (number of words) into bits 1 through 6.

b. Bits 13 through 16 (return address) into bits 29 through 32.

c. Bits 7 through 12 (return store address) into bits 21 through 26.

In addition, other bits of buffer register 208 are set as follows:

a. Bits 20, 27, and 28 to binary ones.

b. Bits 7 through 16 to binary zeroes.

The control word so formed precedes the data in the message to be sent.

The IOP control 200 also reads from the channel control word register 258 the following information:

a. The number of words field into the word counter.

b. The memory address field into the least significant bit positions of the operand program counter 255.

The IOP control 200 sets the Type 1 input channel interrupt 259, freeing the input channel for further operations. The control word in buffer register 208 is sent out over the Type 1 output channel 204 and the first data word accessed from computer memory.

As each data word is transmitted out, the next data word is read from memory so there is no break in the transmission. A parity bit is added by a parity generator 212 for each 16 bits of data transmitted. When the word counter reaches zero, the operation is completed.

Output of data to another computer, when ordered by a control word from memory, makes use of the IOP control 200 and the Type 1 output channel 204.

The operation begins when a control word having the code 011 in bit positions 20, 27, and 28 is read from memory into the control word register 207 of the IOP control 200. The control word is modified by filling the computer address and memory address fields of such word with data accessed from memory by using the initial value of the computer address field as a memory address as previously set forth. The control word is read from the control word register 207 into buffer register 208 and bit position 20 of the buffer register is set to a binary one. The number of words field of the control word register is read into the word counter 209. The contents of the memory location following that location holding the control word are read into the operand program counter 201 as the address of the first data word in the memory. The remainder of the operation is the same as the output of data when requested by another computer previously set forth.

Set matrices in other computers operation makes use of the IOP control 200 and the Type 1 output channel 204.

The operation begins when the control word read from memory into the control word register 207 contains the binary code 0001in bit positions 25 through 28. The data address field of the control work is read out into the least significant bit positions of the operand program counter 201 and data in the memory location with this address is read out. Bit positions 5 through 16 of the control word register 207 are filled with this data. These bits now represent the data that are to be set into the matrices of the other computers.

The contents of the control word register 207 are read into buffer register 208 and then sent out on the Type 1 output channel 204. The transmission of the last parity bit formed in parity generator 212 after the word is sent completes the operation.

Set own matrices according to data from another computer operation makes use of the IOP control 200 and one Type 1 input channel 250.

The operation is started when the Type 1 input channel receives a control word containing the binary code 0001 in bit positions 25 through 28. Bit positions 23 and 24 are investigated to determine which matrix or matrices are to be set. Th data in bit position 5 through 16 are transferred to the appropriate matrices as specified by bits 23 and 24. The Type 1 input channel returns to the idle mode completing the operation.

Sample matrices in another computer operation involves the IOP command control 200, the Type 1 output channel 204, and one Type 1 input channel 250.

The operation starts when a control word containing the binary code 1001 in bits 25 through 28 is read from memory into the control word register 207. The computer address field is set up as set forth hereinabove and the control word sent out over the Type 1 output channel 204. The IOP control 200 sets the word counter 209 to 34. The word counter 209 is counted down at the predetermined logic clock rate. During this 34 clock pulse period, the IOP control 200 monitors the Type 1 input channel interrupts 259. When the correct interrupt is set true, The IOP control 200 compares bits 21 through 26 of the channel control word register 258 with bits 7 through 12 of the IOP command control word register 213. If they match, the IOP command control resets the word counter 209 and goes on to the next operation.

If the two fields do not match, the IOP mode control 206 resumes monitoring the interrupts. If the word counter 209 reaches zero before the right control word is received from channel interrupt 259, the IOP forms a status word indicating the failure to receive the requested data and stores it away in computer memory. The IOP mode control 206 goes on to the next operation.

Sample matrices as requested by another computer operation makes use of the IOP mode control 206, the Type 1 output channel 204, and one to three Type 1 input channels 250.

The operation starts when a control word with the binary code 1001 in bit postions 25 through 28 is received by one Type 1 input channel 250. The receiving channel sets its interrupt 259 true. The IOP mode control 206 samples the interrupts 259 after completion of its last operation and, upon finding one true, proceeds to check the bits 25 through 28 to determine the type of operation.

The IOP mode control 206 then reads the return store address field into bits 21 through 26 of buffer register 208. Bits 23 and 24 of the channel control word register 258 are read into the control word register 207 of the IOP command store register 213. Bits 20, 27 and 28 are set to ones. If bits 23 and 24 of the register 213 are set to zeroes, then bits 6 through 1 of the control word register 207 are set to 000011, respectively. Any other code in bits 23 and 24 of register 213 causes 000001 to be set into bit position 6 through 1, respectively. These bits are the number of words field and are set to a value of one if only one matrix is to be sampled or to a value of three if all matrices are to be sampled, as set forth.

The computer address field (bits29 through 32) is generated according to which computers requested the sampling The IOP control 206 tests each Type 1 input channel interrupt 259. If the interrupt 259 is true, the bit positions 25 through 28 of the channel control word register 258 are tested for the code 1001. If the code is present, a one is placed in the computer address field bit position corresponding to that computer. If the code is not present, or the interrupt 259 was false, a zero is placed in the address field. This is done for all the Type 1 input channels. The control word is now complete and is transferred to buffer register 208.

The control word is transmitted out over the Type 1 output channel 204. After the first half of the control word is transmitted, either the R matrix 106 or other specified matrix is read into the lower half of the bit positions of buffer register 208. The R-matrix 106 is read in if all matrices are to be sampled. If only one matrix was to be sampled, the operation ends after the data are transmitted from buffer register 208. If all matrices are to be sampled, the P-matrix 105 and S-matrix 116 is copied into buffer register 202. The Operation is complete when all the data in both buffer register 202 and 208 are transmitted.

The following chart set forth the number of conventional binary flip-flops contained in the units of the IOP:

BITE COUNTER 245 AND REAL TIME COUNTER 240 ELEMENTS

| Unit | Bits (Flip-Flops) |
|---|---|
| 1. Reset Value Store Register **243** | 15 |
| 2. Real Time Counter **242** | 15 |
| 3. Real Time Counter Interrupt **241** | 1 |
| 4. BITE Counter **245** | 16 |
| 5. BITE Counter Load Request Discrete **246** | 1 |
| 6. Computer NO-Go Discrete **247** | 1 |
| 7. Mode Control **244** | 4 |

MASTER SYNC CONTROLLER 220 ELEMENTS

| Unit | Bits (Flip-Flops) |
|---|---|
| 1. Counter 1 **224** | 4 |
| 2. Counter 2 **226** | 3 |
| 3. Start Counter 1 **224*a*** | 1 |
| 4. Start Counter 2 **226*a*** | 1 |
| 5. All Received Indicator **227** | 1 |
| 6. Not All Received Indicator **228** | 1 |
| 7. Start Cycle Discrete **221** | 1 |
| 8. Mask Register **229** | 4 |
| 9. Mode Control **222** | 5 |
| 10. Input Channel (4 required per Master Sync Controller) | |
| a. Master Sync Word Address Register **225** | 4 |
| b. Arrival Time Register **225a** | 4 |
| c. Channel Arrival Indicator **223** | 1 |

TYPE 1 INPUT CHANNEL 250 ELEMENTS (Four Sets Required)

| Unit | Bits (Flip-Flops) |
|---|---|
| 1. Bit Counter **256*a*** | 6 |
| 2. Word Counter **256** | 6 |
| 3. Operand Program Counter **255** | 16 |
| 4. Channel Buffer Register **252** | 34 |
| 5. Parity Check A **257*a*** | 1 |
| 6. Parity Check B **257*b*** | 1 |
| 7. Parity Error Indicator **257*c*** | 1 |
| 8. Channel Control Word Register **258** | 34 |
| 9. Type 1 Input Channel Interrupt **259** | 1 |
| 10. Input Buffer Register **260** | 32 |
| 11. Memory Write Discrete **261** | 1 |

| Unit | Flip-Flops |
|---|---|
| 12. Comparison Register **253** | 80 |
| 13. Comparison Indicator **254** | 2 |
| 14. Comparison Counter **254a** | 3 |
| 15. Channel Arrival Discrete **251** | 1 |
| 16. Operation Complete Discrete **251***a* | 1 |
| 17. Mode Control **265** | 7 |

TYPE 1 AND 2 OUTPUT CHANNELS AND IOP COMMAND CONTROL 200 ELEMENTS

| Unit | Flip-Flops |
|---|---|
| 1. Command Program Counter **203** | 16 |
| 2. Operand Program Counter **201** | 16 |
| 3. Reset Value Store Register Loaded Indicator **205** | 1 |
| 4. Command Store Register **204** | 32 |
| 5. Interrupt Counter **213** | 2 |
| 6. Buffer Register 1 **202** | 32 |
| 7. Buffer Register 2 **208** | 32 |
| 8. Word Counter **209** | 6 |
| 9. Bit Counter **209a** | 6 |
| 10. Parity Generator **212** | 1 |
| 11. Critical Indicator **205** | 1 |
| 12. Control Word Register **207** | 32 |
| 13. VCS Switched Indicator **205** | 1 |
| 14. Input/Output Indicator **205** | 1 |
| 15. Retransmission Indicator **205** | 1 |
| 16. Retransmit Counter **210** | 2 |
| 17. Acknowledge Word Store **214** | 16 |
| 18. Acknowledge Word Error Indicator **205** | 1 |
| 19. Acknowledge Word Indicator **205** | 2 |
| 20. Overflow Indicator **205** | 1 |
| 21. BITE Counter Filled Indicator **205** | 1 |
| 22. Sync Error Indicator **205** | 1 |
| 23. Real Time Counter Error Indicator **205** | 1 |
| 24. Start Select Indicator **205** | 1 |
| 25. Master Sync Late Indicator **205** | 1 |
| 26. Own VCS Indicator **205** | 1 |
| 27. Mode Control **215** | 9 |

TYPE 2 INPUT CHANNEL 270 ELEMENTS

| Unit | Flip-Flops |
|---|---|
| 1. Bit Counter **271***a* | 6 |
| 2. Parity Check **274** | 1 |
| 3. Comparison Register **273** | 80 |
| 4. Word Counter **271** | 6 |
| 5. Signal Detector **275** | 1 |
| 6. Type 2 Input Channel Operating Indicator **276** | 1 |
| 7. Comparison Indicator **272** | 1 |
| 8. Type 2 Input Channel Operation Complete Indicator **277** | 1 |
| 9. Mode Control **278** (Including Parity Error Indicator **274**) | 7 |

As has been previously set forth, the conventional Input/Output unit in the computer modules A, B, C, and D may alternatively be used with the VCS of the present invention in addition to the IOP set forth hereinabove.

OPERATION OF INVENTION

In the operation of the present invention, the computer system S may be operated in a variety of interconnection modes depending upon the desired degree of redundancy in the processing of the data by such computer system. The interconnection modes are performed in the adaptive voting in the voter-comparator-selector unit 140 of the VCS. The votin taking place is adaptive in that once an error has been detected in a computer module or the control apparatus P associated therewith, output signals and data and commands from such computer module are disregarded in subsequent voting in order that erroneous data are not used in the computer system S. When the erroneous data are detected in the adaptive voting, a software program stored in the memory of the computer modules may replace the failed or erroneous computer module with a standby computer module if less than four modules are taking part in the adaptive voting. If all four computer modules are taking part in four-way voting, the software program may instruct the failed computer module to withdraw from voting, and the remaining three VCS'es then assume the three-way voting mode.

The hardware design in the VCS permits the variety of desired interconnection modes to be adaptively established in accordance with the operational/failure status determined in the control unit 100 of the VCS.

The hardware in the IOP and the VCS is controlled by a software executive control program in the computer system S. This program is distribted among the four computer modules, with the VCS hardware acting upon the instructions of the software control system by the adaptive majority rule previously set forth. In this manner, hard core software failures are eliminated. The VCS further, as has been previously set forth, presents the condition of its operational/failure status as well as the results of the voting/comparison processes performed in the voter-comparator-selector unit 140 for examination when interrogated by the software executive program.

As an example of the operation, computer modules A, B, and C may operate in a three-way voting mode, with computer module D performing another task or in a standby state, or a failed state. The VCS of the control apparatus P currently voting, for example the control apparatus P associated with computer module A, receives copies of the message from each of the three computer modules A, B, and C, and performs an adaptive majority vote on the contents of the message in the VCS. The adaptive majority vote so determined in the VCS is transmitted on the I/O bus 10 to the external subsystem. At this time, the IOP's in each of the apparatus P associated with computer modules A, B, and C monitor the messages transmitted by the VCS by comparing the information sent to the VCS with the information transmitted on the I/O bus 10, noting any discrepancies and forming a "Go/No-Go" code and sending such code to the VCS at the end of the monitoring process from each IOP. Once again, the majority "Go/No-Go" opinion transmitted on the I/O bus 10.

Each IOP also monitors the Go/No-Go code transmitted on the bus in order to determine if such IOP is in agreement with the majority adaptive vote. The IOP can then retransmit the message in the event of a majority No-Go opinion.

The IOP's may then proceed to the next message in the program from the computer memory, or may be required to re-transmit the previous message. This retransmission is attempted twice with the same VCS, and if three successive transmissions fail, the IOP's then switch over to a new VCS. Three successive transmission failures with the new VCS will result in the software program in the computer memory being notified. The program, depending upon the criticality of the operation currently being performed may attempt to self-repair the computer modules to overcome the transmission failure, or may omit the transmission of the message, should such message be noncritical, or other steps may be taken in accordance with the desires of the software programmer, in order that the computer system S operates in a fail-operation, fail-safe manner.

The foregoing disclosure and description of the invention are illustrative and explanatory thereof, and various changes in the size, shape, materials, components, circuit elements, wiring connections, and contacts, as well as in the details of the illustrating circuitry and construction may be made without departing from the spirit and the invention.

What is claimed is:

1. An adaptive control apparatus for a plurality of self-testing data processing computer modules whereby operational computer modules of said plurality of interconnectable with a data bus and failed computer modules of said computer are excluded from communication with the data bus in accordance with the operational/failure status of the computer modules, said apparatus comprising:

a control means for each computer module for deriving the operational/failure status of each of said computer modules, determining a desired interconnection mode for said computer modules and generating an electrical signal representative of said desired interconnection mode, each said control means for each computer module including P matrix logic means electrically interconnected with said computer modules for receiving input data signals from each said computer module and for deriving signals indicative of the operational/failure status of each said computer module from input data signals, P matrix storage means for storing the signals indicative of the operational/failure status of each of said computer modules, R memory matrix means for storing signals representing desirable interconnection modes for said computer modules, R matrix logic means coupled to said P matrix storage means and said R matrix means and responsive to said signals stored therein to derive signals indicative of a desired interconnection mode for said computer modules;

an adaptive voter comparator switch means coupled to said R matrix logic means and to each said computer module and operative in response to the input signals from said computer modules and the signals derived from said R matrix logic means which are indicative of the desired interconnection mode for said computer modules to connect selected computer modules in the desired interconnecting mode.

2. An adaptive control apparaus for a plurality of self-testing data processing computer modules whereby operational computer modules of said plurality are interconnectable with a data bus and failed computer modules of said plurality are excluded from communication with the data bus in accordance with the operational/failure status of the computer modules, said apparatus comprising:

a control means for each computer module for deriving the operational/failure status of each of said computer modules, determining a desired interconnection mode for said computer modules and generating an electrical signal representative of said desired interconnection mode, each said control means for each computer module including P matrix logic means electrically interconnected with said computer modules for receiving input data signals from each said computer module and by adaptive majority voting deriving signal indictive of the operational/failure status of each said computer module from said input data signals, P matrix storage means for storing the signals indicative of the operational/failure status of each of said computer modules, R memory matrix means for storing signals representing desirable interconnection modes for said computer modules, R matrix logic means coupled to said P matrix storage means and said R matrix means and responsive to said signals stored therein to derive signals by an adaptive majority logic decision to indicate a desired interconnection mode for said computer modules;

an adaptive voter comparator switch means coupled to said R matrix logic means and to each said computer module and operative in response to the input signals and said computer modules and the signals derived from said R matrix logic means to connect selected computer module to the data bus in the desired interconnecting mode by adaptive majority voting in accordance with their operational/failure status.

3. An adaptive control apparatus as recited in claim 2, further including input-output processor means with each computer and operably coupled with said data bus for effecting intercommunication and control operation between said computer modules and said control means for each computer module.

4. An adaptive control apparatus as recited in claim 2, further including means coupled to said R matrix logic means and to each said computer module for inspecting the input data signals to said adaptive voter comparator switch means to detect errors therein and effectively remove the erroneous signals from the adaptive majority voting process of said-adaptive voter comparator switch means.

5. An adaptive control apparatus as recited in claim 2 wherein each said computer module includes self-test equipment and is responsive to self-test equipment for indicating a failure in the operation of such computer module and said P matrix logic means derives said signal indicative of the operational/failure status of each computer module by indicating a failure test for a particular computer module when the particular module is indicated as failed by self-test equipment or whenever a majority of the computer modules currently voting indicates such particular computer module is in a failure status,

6. An adaptive control apparatus as recited in claim 3 wherein said adaptive control apparatus controls four data processing computer modules and said R memory matrix means stores signals representing interconnection modes for said computer modules wherein the computer modules are operative in a majority mode thereby performing a redundancy reduction of either four to one or three to one.

7. An adaptive control apparatus as recited in claim 3 wherein said adaptive control apparatus controls four data processing computer modules and said R memory matrix means stores signals representing interconnection modes for said computer modules wherein the computer modules are operative in a comparison mode thereby performing a redundancy reduction of two to one.

* * * * *